US012432056B2

United States Patent
Chakraborty et al.

(10) Patent No.: US 12,432,056 B2
(45) Date of Patent: Sep. 30, 2025

(54) UNIFIED KEY MANAGEMENT

(71) Applicant: Rubrik, Inc., Palo Alto, CA (US)

(72) Inventors: Pragyan Chakraborty, Bengaluru (IN); Sai Kiran Katuri, Santa Clara, CA (US); Prateek Pandey, Bengaluru (IN); David Anthony Terei, New York City, NY (US); Hao Wu, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 351 days.

(21) Appl. No.: 18/139,264

(22) Filed: Apr. 25, 2023

(65) Prior Publication Data

US 2024/0305457 A1    Sep. 12, 2024

(30) Foreign Application Priority Data

Mar. 7, 2023  (IN) .............................. 202311015264

(51) Int. Cl.
*H04L 9/08*        (2006.01)
*H04L 9/14*        (2006.01)

(52) U.S. Cl.
CPC .............. *H04L 9/0891* (2013.01); *H04L 9/14* (2013.01); *H04L 9/0861* (2013.01)

(58) Field of Classification Search
CPC ....... H04L 9/0891; H04L 9/14; H04L 9/0822; H04L 9/0861
See application file for complete search history.

(56) References Cited

U.S. PATENT DOCUMENTS

| | | | | |
|---|---|---|---|---|
| 10,587,406 | B1 * | 3/2020 | Levin ..................... | H04L 9/0869 |
| 11,695,555 | B2 * | 7/2023 | Roth ........................ | H04L 9/321 |
| | | | | 713/176 |
| 2008/0260159 | A1 * | 10/2008 | Osaki ................... | H04L 63/0464 |
| | | | | 380/277 |
| 2011/0191594 | A1 * | 8/2011 | Bartlett ............... | G06F 11/2056 |
| | | | | 713/189 |
| 2018/0287785 | A1 * | 10/2018 | Pfannenschmidt ... | H04L 9/0822 |
| 2021/0152336 | A1 * | 5/2021 | Seaborn ................ | H04L 9/0891 |
| 2023/0224154 | A1 * | 7/2023 | Gopalakrishna ...... | H04L 9/0891 |
| | | | | 713/171 |
| 2024/0048380 | A1 * | 2/2024 | Berger .................... | G06F 9/547 |

* cited by examiner

*Primary Examiner* — Shanto Abedin

(74) *Attorney, Agent, or Firm* — Holland & Hart LLP

(57) ABSTRACT

Methods, systems, and devices for data management are described. A data management system (DMS) may create a first key family including a first key to encrypt and decrypt first data encryption keys associated with first data management jobs. The DMS may create a second key family after encrypting the first data encryption keys using the first key. A first key of the second key family may be used to encrypt and decrypt second data encryption keys that are associated with second data management jobs. The DMS may create a second key of both the first and second key families. The second key of the first key family may be used to decrypt the first data encryption keys. The second key of the second key family may be used to encrypt third data encryption keys and to decrypt the second data encryption keys and the third data encryption keys.

20 Claims, 13 Drawing Sheets

UNIFIED KEY MANAGEMENT

RELATED APPLICATIONS

The present application claims priority to Indian Patent Application No. 202311015264, entitled "UNIFIED KEY MANAGEMENT" and filed Mar. 7, 2023, which is assigned to the assignee hereof and expressly incorporated by reference herein.

FIELD OF TECHNOLOGY

The present disclosure relates generally to data management, including techniques for unified key management.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
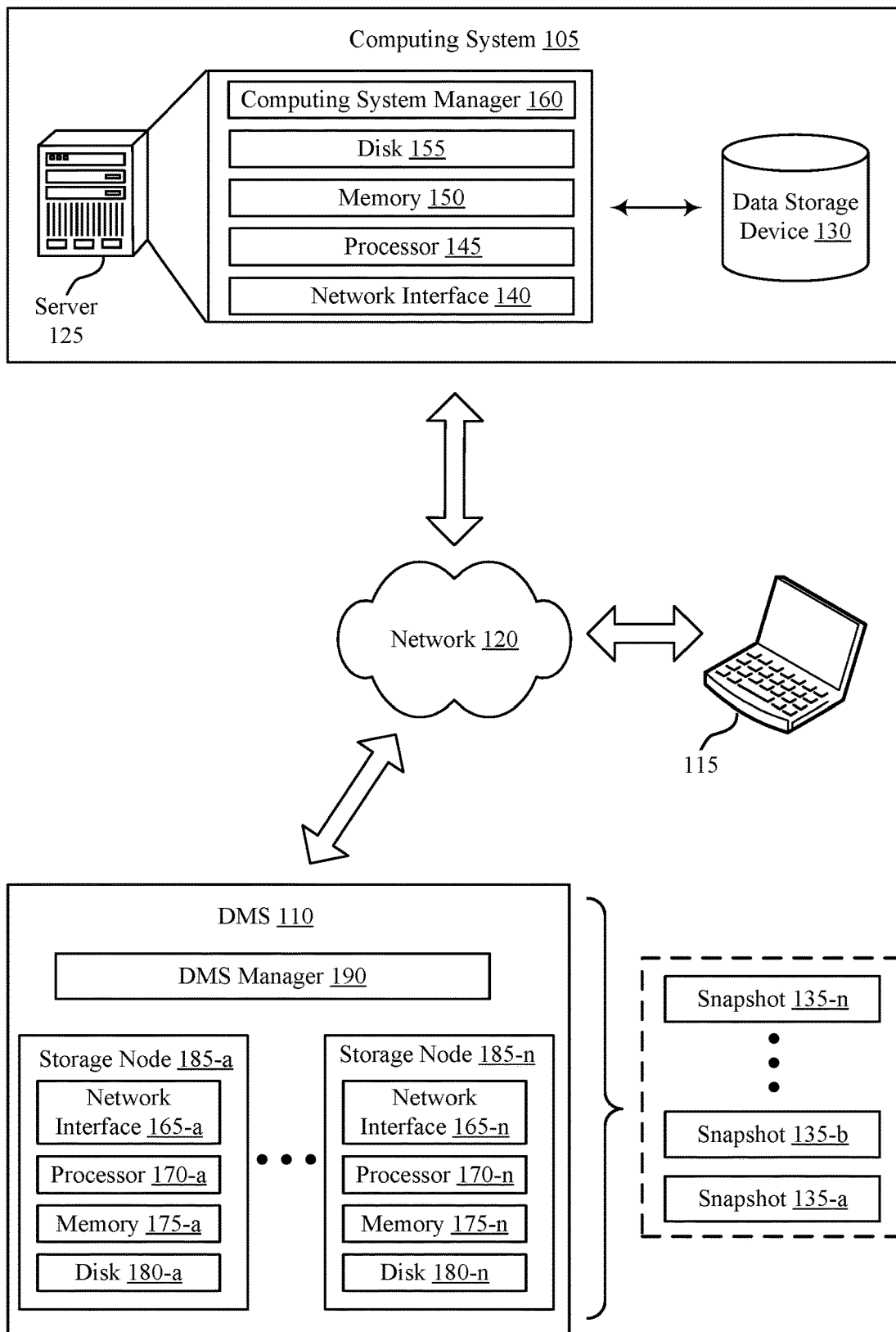
FIG. 1 illustrates an example of a computing environment that supports unified key management in accordance with aspects of the present disclosure.

In some systems, a data management system (DMS) may perform unified key management, which may include key rotation and rekeying operations. Key rotation may refer to the periodic updating of which encryption keys are in use (e.g., may involve the creation of a new family of one or more keys), and rekeying may refer to reencryption of an object using a new key. Both key rotation and rekeying may enhance the security of encrypted data. Techniques, systems, and devices described herein provide for a key rotation/rekeying scheme for use in a data management system (e.g., for keys associated with encrypting and decrypting backup data) that beneficially can be used across a variety of different storage architectures and locations for the backup data and beneficially avoids excessive (e.g., unduly frequent) reencryption of the backup data, among other possible benefits.

A hierarchical set of keys may be used to protect backup data, where the hierarchical set of keys may include data encryption keys (DEKs) that are used to encrypt the backup data and may also include any quantity of layers of key encryption keys (KEKs). For example, root KEKs may be implemented at the top of the hierarchy and used to encrypt intermediary KEKs, while intermediary KEKs may be implemented at an intermediate level of the hierarchy and used to encrypt DEKs, and DEKs may be implemented at the bottom of the hierarchy and used to encrypt data (e.g., backup data). In some examples, multiple levels of intermediary KEKs may be implemented, with relatively higher-level intermediary KEKs used to encrypt relatively lower-level intermediary KEKs. Further, in some examples, the intermediary KEKs, the DEKs, or both may be stored in a library that is accessible to external key managers that are called by backup/restore jobs at respective computing devices.

To incorporate key rotation/rekeying into the hierarchical keying scheme, KEKs at an intermediary level of the key hierarchy may be rotated and rekeyed so that new intermediary KEKs are used and DEKs are reencrypted with different intermediary KEKs over time. Starting with one family of intermediary KEKs that includes a single KEK member, rotating the KEKs may involve creating a new family of intermediary KEKs that includes a new KEK member. Prior to creating the new family, the KEK member in the first family may be used to encrypt(write)/decrypt (read) DEKs generated by data management jobs. After creating the new family, the KEK member in the new family may be used to encrypt DEKs and the KEK member in the first family may be used to decrypt DEKs previously encrypted with the KEK member in the first family. Also, rekeying KEKs may involve adding new KEK members to each KEK family. In such cases, the old KEK members in both families may be inactivated, the new KEK member in the first family may be used to decrypt previously encrypted DEKs, and the new KEK member in the second family may be used to encrypt/decrypt subsequent DEKs. For subsequent rotation/rekeying, these operations may be repeated.

FIG. 1 illustrates an example of a computing environment 100 that supports unified key management in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, information, or any combination thereof may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below:

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160) may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

A DMS 110 may be configured to protect (e.g., back up, take snapshots of, replicate) data of the computing system 105. In some examples, the DMS 110 stores the protection data. In other examples, the computing system 105 stores the protection data. In yet other examples, both the DMS 110 and the computing system 105 store the protection data. In some cases, agents of the DMS 110 may be installed on the computing system 105 and used to generate the protection data. Based on generating the protection data, the agents may send the data to a storage location—e.g., at the DMS 110 or at the computing system 105. In other cases, nodes of the DMS 110 may perform data protection tasks for data of the computing system 105 that is stored at the DMS 110. Thus, the protection data may be generated at the computing system 105 and stored at the DMS 110, the protection data may be generated and stored at the computing system 105, or the protection data may be generated and stored at the DMS 110.

For data security reasons, the protection data may be encrypted before it is stored (e.g., during the data protection operation or after the data protection operation completes). To encrypt the data, a job (e.g., a snapshot job, a backup job, etc.) creating the protection data may use a key for encrypting data (which may be referred to as a DEK). The DEK may be generated by the job or by a DEK manager. To improve security for the data, a new DEK may be used (e.g., periodically, when an event occurs, etc.) to generate subsequent encrypted data for subsequent jobs—e.g., so that not all of the encrypted backup data is encrypted using the same key. That is, as more data is encrypted with a single key, it may become easier to break the encryption, and rotating the DEK may prevent this loss in security. Also, it prevents the compromise of one key from breaking the encryption of all of the encrypted data. Changing the DEK used to encrypt subsequent data may be referred to as "key rotation."

To further improve security, encrypted data may be reencrypted with a new DEK (e.g., periodically, when an event occurs, etc.)—e.g., so that encrypted data is not encrypted with the same DEK in perpetuity. That is, with enough time, encryption may be broken, but by rekeying encrypted data, the statistical probability of breaking the encryption for the encrypted data may be maintained below a feasible level. As part of rekeying, the encrypted backup data may be reencrypted in accordance with the new DEK. Changing the DEK used for particular data may be referred to as "rekeying."

In some examples, the DEKs used to encrypt data may be stored—e.g., in a DEK manager. A DEK manager may be used to generate DEKs, store generated DEKs, and to provide DEKs requested for decrypting corresponding encrypted data. For example, a restore job for a data object may request, from the DEK manager, the DEK previously used to encrypt protection data generated for the data object before the restoration can be performed. To secure the DEKs stored in the DEK manager, the stored DEKs may be encrypted with a key for encrypting keys (which may be referred to as a KEK)—e.g., so that the DEKs are not stored in a plain-text format. In such cases, the DEK may not be used to decrypt data without the KEK first being used to decrypt the DEK into the plain-text format.

In some examples, the KEK may be generated by and stored at a third-party key service and may be referred to as a "root KEK." As described with reference to the DEKs, rekeying may similarly be used for the root KEK used to encrypt the DEKs stored in the DEK manager. As part of rekeying the root KEK, the encrypted DEK may be reencrypted in accordance with the new root KEK. In some examples, the rekeying operations may be managed (e.g., controlled, limited, etc.) by the third-party key service. Accordingly, in order to decrypt the DEKs, the DEK manager may be unable to decrypt the DEKs without first requesting the root KEK from the third-party key service. Thus, the DEK manager may be unable to support data management operations (e.g., data integrity check operations, compression operations, deduplication operations, etc.), data security operations (e.g., DEK rotation and DEK rekeying), data backup operations, data restoration operations, or any combination thereof without first obtaining the root KEK. In some examples, the DEK manager may cache the root KEK for a prescribed period of time—e.g., to reduce the quantity of calls to the third-party key service. Thus, techniques and configurations that provide independent control over KEK rotation and KEK rekeying may be desired.

To obtain control over KEK rotation and KEK rekeying, one or more additional layers of KEKs (which may be referred to as intermediary KEKs) may be introduced between the root KEK and the DEK, where the root KEK may be used to encrypt the intermediary KEKs. The KEKs in the additional layers may be referred to as intermediary KEKs. If multiple layers are added, then KEKs in a first layer may be referred to as first-layer intermediary KEKs, KEKs in a second layer may be referred to as second-layer intermediary KEKs, and so on. Based on introducing the intermediary KEKs, the KEKs used by jobs to obtain plain-text DEKs may be rotated and rekeyed independently of the root KEK.

By enabling independent and intermediate KEK rotation, the benefits of key rotation may be obtained as multiple KEKs may be used to protect respective sets of DEKs—e.g., a latest KEK may be used to protect current DEKs, a prior KEK may be used to protect a prior set DEKs, a further prior KEK may be used to protect a further prior set of DEKs, and so on. By contrast, if a single root KEK is used, then all DEKs may be protected by the same root KEK. Also, by enabling independent and intermediate KEK rekeying, benefits of rekeying may be obtained for the DEKs without rotating the DEKs themselves (e.g., which would result in reencryption of the underlying data) or the root KEK. That is, benefits of rekeying may be obtained for a set of DEKs by rekeying a corresponding intermediate KEK. Additionally, because different intermediate KEKs may be used to protect different sets of DEKs, the intermediate KEKs used for each set of DEKs may be individually rekeyed bringing benefits of rekeying to each set of protected DEKs.

Figure 2:
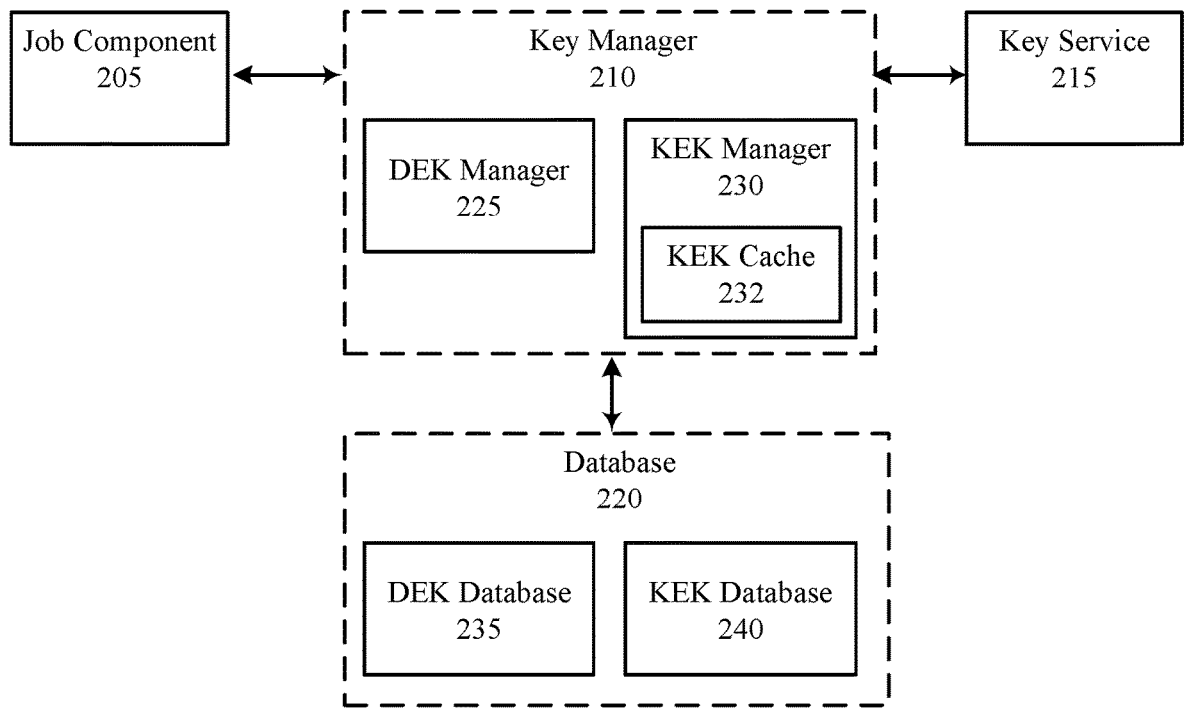
FIG. 2 shows an example of a subsystem that supports unified key management in accordance with aspects of the present disclosure.

FIG. 2 shows an example of a subsystem 200 that supports unified key management in accordance with aspects of the present disclosure. The subsystem 200 may include the job component 205, the key manager 210, the key service 215, and the database 220. In some examples, the job component 205, the key manager 210, and the database 220) may be implemented within a single computing system (e.g., the computing system 105 of FIG. 1). In other examples, the job component 205, the key manager 210, and the database 220) may be separated across multiple computing systems—e.g., the job component 205 and the key manager 210 may be implemented within the computing system 105 and the database 220 may be implemented within the DMS 110 of FIG. 1.

The job component 205 may be configured to schedule and execute data management tasks, data security tasks, data backup tasks, data restoration tasks, and the like. In some examples, prior to performing a task, a job executed by the job component may obtain a DEK for decrypting the data for which the task applies. In some examples, as part of performing a task, the job component may encrypt data generated by the task—e.g., during or after generation of the data.

The key manager 210 may be configured to manage DEKs used to encrypt/decrypt data generated by one or more jobs and to manage intermediate KEKs used to encrypt/decrypt the DEKs. The key manager 210 may be configured to generate DEKs and intermediate KEKs as well as to manage the execution of key rotation and rekeying operations for the DEKs and intermediate KEKs. The key manager 210 may include the DEK manager 225 and the KEK manager 230).

The DEK manager 225 may be configured to generate DEKs—e.g., in response to a request from a data protection job. The DEK manager 225 may also be configured to retrieve and decrypt encrypted DEKs from the DEK database 235—e.g., in response to a request from a restoration job seeking to decrypt the data to be restored. The DEK manager 225 may also be configured to rekey the DEKs (e.g., periodically), which may include posting a rekeying job to a job queue managed by the job component and reencrypting the underlying data protected by the DEKs. The DEK manager 225 may be configured to correlate each generated DEK with an object identifier (ID) identifying the data/data object encrypted by a generated DEK. The DEK manager 225 may be further configured to initiate a storage, in the DEK database 235, of encrypted versions of the DEKs with their corresponding object IDs as well as an indication of the corresponding parent intermediate KEKs used to encrypt the DEKs. In some examples, after storing an encrypted DEK in the DEK database 235, the DEK manager 225 may be configured to delete the plain-text version of the DEK.

The KEK manager 230) may be configured to generate intermediate KEKs. The KEK manager 230 may be further configured to use the generated intermediate KEKs to encrypt DEKs prior to the DEK manager 225 storing the encrypted DEKs in the DEK database 235—e.g., in response to a request from the DEK manager 225 to encrypt a DEK.

The KEK manager 230) may be configured to rotate and rekey the intermediate KEKs (e.g., in accordance with an intermediate KEK rotation/rekeying schedule). For example, the KEK manager 230) may be configured to rotate the intermediate KEKs (e.g., periodically) so that subsequently generated DEKs are protected by the new intermediate KEK resulting from the rotation. For each rotation operation, the KEK manager 230 may create a new KEK family that includes a first intermediate KEK. The first intermediate KEK may be used for reading/writing subsequent DEKs generated by the DEK manager 225. And a latest intermediate KEK in a preceding KEK family may be used only for reading previous DEKs generated by the DEK manager 225 while the latest intermediate KEK was active.

The KEK manager 230 may also be configured to rekey the intermediate KEKs (e.g., periodically), which may include reencrypting the underlying DEKs protected by the intermediate KEKs. For each rekeying operation, individual intermediate KEKs may be added to each existing KEK family, and the underlying sets of DEKs protected by the added intermediate KEKs may be reencrypted. Within the respective families, the added intermediate KEKs may be used to encrypt corresponding sets of DEKs in place of the preceding intermediate KEKs.

The KEK manager 230 may be configured to use the generated intermediate KEKs to decrypt DEKs—e.g., in response to a request from the DEK manager 225 to decrypt an encrypted DEK. In some examples, before servicing a request from the DEK manager 225 to decrypt an encrypted DEK, the KEK manager 230 may also be configured to retrieve, and decrypt, encrypted intermediate KEKs from the KEK database 240. To decrypt an intermediate KEK, the KEK manager 230) may be configured to retrieve the root KEK from the key service 215 and may use the root KEK to decrypt the intermediate KEKs retrieved from the KEK database 240. Once an intermediate KEK is decrypted, the KEK manager 230) may be configured to decrypt a DEK received from the DEK manager 225.

In other examples, the KEK manager 230) may determine that a plain-text intermediate KEK corresponding to a DEK received from the DEK manager 225 is stored within the KEK cache 232—e.g., in a plain-text format. In such cases, the KEK manager 230) may use the intermediate KEK to decrypt the received DEK without accessing the KEK database 240) or the key service 215.

In some examples, rather than being performed at the KEK manager 230), the operations associated with generating, rotating, rekeying, and storing intermediate KEKs may be performed at the database 220 (or a component managed by a same operator as the database 220). In such cases, the KEK manager 230 may request intermediate KEKs from the database 220 (e.g., periodically, in response to a request to encrypt/decrypt a DEK, etc.). In such cases, the generation of the intermediate KEKs may be centralized and distributed to multiple key managers implemented across multiple computing deployments. In some examples, the database 220 is a multi-tenant database, where families of intermediate KEKs are generated on a per-customer basis.

The key service 215 may be configured to generate and store a root KEK used to by the key manager 210 to decrypt the intermediate KEKs. The key service 215 may be managed by a different operator and may be implemented on a separate infrastructure than the job component 205, the key manager 210, and the database 220. The key service 215 may be configured to send the root KEK to the key manager 210—e.g., in response to a request from the KEK manager 230 seeking to decrypt an intermediate KEK.

Figure 3:
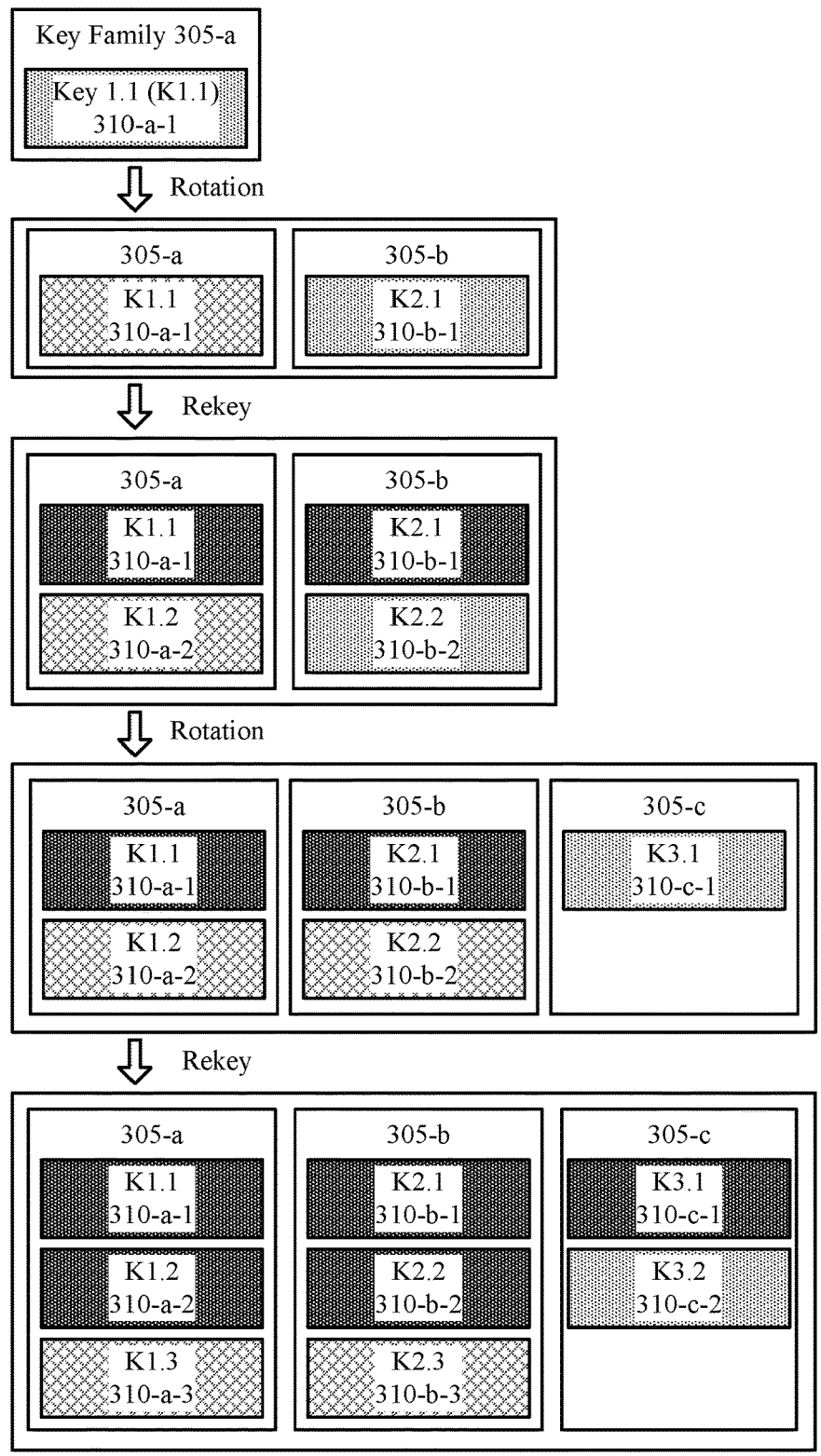
FIG. 3 shows an example of a key architecture that supports unified key management in accordance with aspects of the present disclosure.

FIG. 3 shows an example of a key architecture 300 that supports unified key management in accordance with aspects of the present disclosure. The key architecture 300 depicts the creation of KEK families (e.g., the first KEK family 305-*a*, the second KEK family 305-*b*, and the third KEK family 305-*c*) and KEK generations within the KEK families as rotation and rekeying operations are performed. In some examples, each intermediate KEK in a KEK family may correspond to a KEK generation—e.g., the first KEK 310-*a*-1 in the first KEK family 305-*a* may be a first KEK generation, the second KEK 310-*a*-2 in the first KEK family 305-*a* may be a second KEK generation, and so on.

The key architecture 300 initially depicts the first KEK family 305-*a* as the single existing key family. The key architecture 300 initially also depicts the first KEK family 305-*a* as the first KEK 310-*a*-1 as the single KEK generation in the first KEK family 305-*a*. The first KEK 310-*a*-1 may be denoted as K1.1 (K {family}. {generation}) to indicate that the first KEK 310-*a*-1 is a part of the first KEK family 305-*a* and is the first generation of KEKs in the first KEK family 305-*a*. The first KEK 310-*a*-1 may also be denoted as the active read/write KEK (or "active KEK"). As the active KEK, the first KEK 310-*a*-1 may be used for writing (e.g., encrypting) DEKs generated while the first KEK 310-*a*-1 is the active KEK. The first KEK 310-*a*-1 may also be used for reading (e.g., decrypting) the DEKs generated while the first KEK 310-*a*-1 is the active KEK.

After a KEK rotation operation is performed, the key architecture 300 depicts the first KEK family 305-*a* and the second KEK family 305-*b*, where the second KEK family 305-*b* may include the first KEK 310-*b*-1 as the single KEK generation in the second KEK family 305-*b*. After the KEK rotation operation is completed, the first KEK 310-*b*-1 becomes the active KEK, and the first KEK 310-*a*-1 of the first KEK family 305-*a* becomes the active read-only KEK. As the active read-only KEK, the first KEK 310-*a*-1 of the first KEK family 305-*a* may be used only to decrypt DEKs previously encrypted with the first KEK 310-*a*-1 while the first KEK 310-*a*-1 was the active KEK. As the active KEK, the first KEK 310-*b*-1 of the second KEK family 305-*b* may be used to encrypt and encrypted DEKs generated while the first KEK 310-*b*-1 is the active KEK. The first KEK 310-*b*-1 of the second KEK family 305-*b* may also be used to decrypt the DEKs generated while the first KEK 310-*b*-1 is the active KEK.

After a KEK rekeying operation is performed, the key architecture 300 again depicts the first KEK family 305-*a* and the second KEK family 305-*b*. However, the first KEK family 305-*a* now includes, as a second generation KEK, the second KEK 310-*a*-2, and the second KEK family 305-*b* now includes, as a second generation KEK, the second KEK 310-*b*-2. After the rekeying operation is completed, the second KEK 310-*a*-2 of the first KEK family 305-*a* becomes the active read-only KEK, and the second KEK 310-*b*-2 of the second KEK family 305-*b* becomes the active KEK. Also, the first KEK 310-*a*-1 of the first KEK family 305-*a* and the first KEK 310-*b*-1 of the second KEK family 305-*b* becomes inactive/archived KEKs.

Accordingly, the second KEK 310-*a*-2 of the first KEK family 305-*a* may be used to read (decrypt) DEKs encrypted with the first KEK 310-*a*-1 of the first KEK family 305-*a*. And the second KEK 310-*b*-2 of the second KEK family 305-*b* may be used to read (decrypt) DEKs encrypted with the first KEK 310-*b*-1 of the second KEK family 305-*b*. Additionally, as the active KEK, the second KEK 310-*b*-2 of the second KEK family 305-*b* may be used for writing (e.g., encrypting) DEKs generated while the second KEK 310-*b*-2 is the active KEK. And the second KEK 310-*b*-2 may be used for reading (e.g., decrypting) the DEKs generated while the first KEK 310-*b*-1 was the active KEK. That is, the second KEK 310-*b*-2 of the second KEK family 305-*b* may be used to write (encrypt) DEKs generated while the second KEK 310-*b*-2 is the active KEK and to read (decrypt) both DEKs generated while the first KEK 310-*b*-1 of the second KEK family 305-*b* was the active KEK and DEKs generated while the second KEK 310-*b*-2 is the active KEK.

In some examples, as part of the rekeying operation, the DEKs previously protected by the first KEK 310-*a*-1 of the first KEK family 305-*a* may be converted to plain-text using the first KEK 310-*a*-1 and reencrypted using the second KEK 310-*a*-2 of the first KEK family 305-*a*. Also, the DEKs previously protected by the first KEK 310-*b*-1 of the second KEK family 305-*b* may be converted to plain-text using the first KEK 310-*b*-1 and reencrypted using the second KEK 310-*b*-2 of the second KEK family 305-*b*. In such cases, the plain-text versions of the DEKs may not change during the KEK rekeying operation.

After a second KEK rotation operation is performed, the key architecture 300 depicts the first KEK family 305-*a*, the second KEK family 305-*b*, and the third KEK family 305-*c*. After the second KEK rotation operation, the first KEK 310-*c*-1 of the third KEK family 305-*c* becomes the active KEK. The second KEK 310-*b*-2 of the second KEK family 305-*b* becomes the active read-only KEK for the DEKs currently encrypted using the second KEK 310-*b*-2 (which includes the DEKs previously encrypted using the first KEK 310-*b*-1 of the second KEK family 305-*b*). And the second KEK 310-*a*-2 of the first KEK family 305-*a* becomes the active read-only KEK for the DEKs currently encrypted using the second KEK 310-*a*-2 (which includes the DEKs previously encrypted using the first KEK 310-*a*-1 of the first KEK family 305-*a*).

After a second KEK rekeying operation is performed, the third KEK 310-*a*-3 is added to the first KEK family 305-*a*, the third KEK 310-*b*-3 is added to the second KEK family 305-*b*, and the second KEK 310-*c*-2 is added to the third KEK family 305-*c*. Accordingly, the third KEK 310-*a*-3 of the first KEK family 305-*a* becomes the active read-only KEK for decrypting the DEKs encrypted using the first KEK family 305-*a*. The third KEK 310-*b*-3 of the second KEK family 305-*b* becomes the active read-only KEK for decrypting the DEKs encrypted using KEKs of the second KEK family 305-*b*. And the second KEK 310-*c*-2 of the third KEK family 305-*c* becomes the active KEK for encrypting currently generated DEKs and for decrypting DEKs encrypted using KEKs of the third KEK family 305-*c*. Also, the second KEK 310-*a*-2 of the first KEK family 305-*a*, the second KEK 310-*b*-2 of the second KEK family 305-*b*, and the first KEK 310-*c*-1 of the third KEK family 305-*c* become inactive/archived KEKs.

In some examples, the key architecture 300 enables a customer to gradually incorporate customer-generated KEKs—e.g., until all of the KEKs used for the customer are customer-generated. For example, during a rotation operation, a customer-generated KEK may be used for the first KEK included in the new KEK family. And during a rekeying operation, one or more customer-generated KEKs may be used for the KEKs added to each of the existing KEK families.

Figure 4:
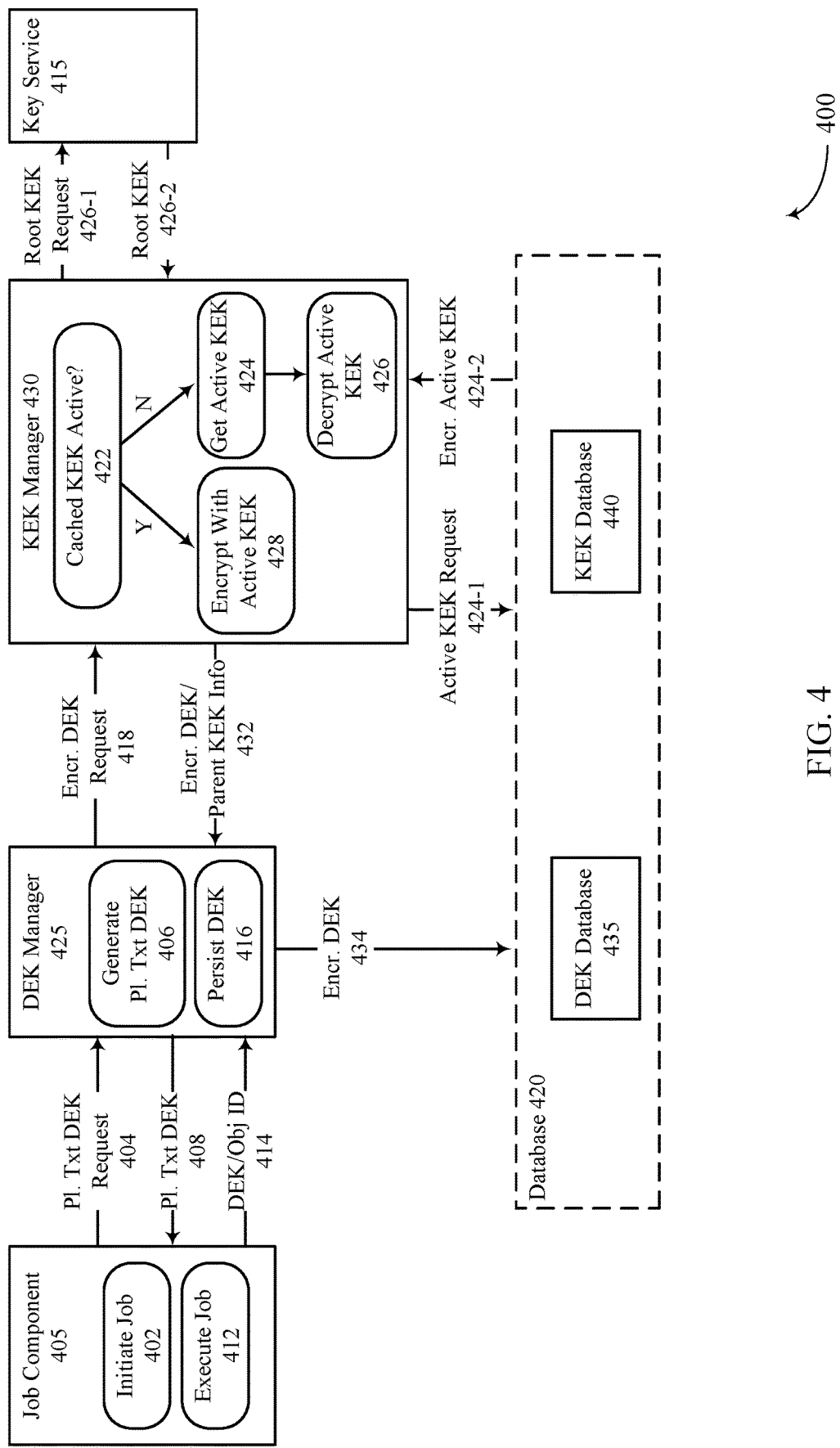
FIG. 4 shows an example of a process diagram that supports unified key management in accordance with aspects of the present disclosure.

FIG. 4 shows an example of a process diagram 400 that supports unified key management in accordance with aspects of the present disclosure. The process diagram 400 may be performed by the job component 405, the DEK manager 425, the KEK manager 430, the key service 415, and the database 420, which may be respective examples of a job component, DEK manager, KEK manager, key service, and database described herein (e.g., the job component 205, the DEK manager 225, the KEK manager 230, the key service 215, and the database 220 of FIG. 2, respectively). Also, the database may include the DEK database 435 and the KEK database 440, which may be respective examples of a DEK database and KEK database described herein (e.g., the DEK database 235 and the KEK database 240 of FIG. 2, respectively).

In some examples, the process diagram 400 illustrates an example set of operations performed to support unified key management. For example, the process diagram 400 may include operations for performing a data protection operation that encrypts the generated data protection information using DEKs and KEKs generated in accordance with the techniques described herein.

At 402, a data protection job (e.g., a backup or snapshot job) may be initiated at the job component 405—e.g., based on the data protection job being pulled from a job queue. The data protection job may be for a particular data object (e.g., a VM, a blob, etc.), and the data protection job may execute a data protection operation for the data object. The data protection job may also include an indication that the data protection information generated by the data protection job is to be encrypted—e.g., during the data protection job or after the data protection job is completed.

At 404, based on an encryption parameter being set for the data protection job, a request for a plain-text DEK may be sent to the DEK manager.

At 406, the plain-text DEK may be generated at the DEK manager 425—e.g., in accordance with an encryption algorithm, such as SHA-256. In some examples, the encryption algorithm used to generate the plain-text DEK is indicated in the request for the plain-text DEK.

At 408, the generated plain-text DEK may be sent to the job component 405.

At 412, the job component 405 may execute the data protection job and may use the received plain-text DEK to encrypt the data protection information generated by the data protection job.

At 414, after the data protection job completes successfully, the plain-text DEK used to encrypt the data protection information and an object identifier identifying the data object for which the data protection information is generated may be sent to the DEK manager.

At 416, the plain-text DEK and associated object ID may be temporarily stored (which may be referred to as persisting the plain-text DEK) until the plain-text DEK is encrypted and stored in the DEK database 435.

At 418, a request to encrypt the plain-text DEK may be sent to the KEK manager 430. The request may include the plain-text DEK.

At 422, a determination of whether the active KEK (the KEK used for reading/writing currently generated DEKs) is cached at the KEK manager 430 may be made. In some examples, the active KEK be cached in a plain-text format. Caching the active KEK at the KEK manager 530 may reduce a quantity of calls to the KEK database 540 (as thousands of requests for the active KEK may be made in a day). In some examples, the KEK manager 530 caches the active KEK for a prescribed duration (e.g., 15 minutes) and requests the active KEK at the end of the prescribed duration—e.g., in case the active KEK has changed.

At 424, based on determining that the active KEK is not cached at the KEK manager 430, operations for obtaining the active KEK may be performed. At 424-1, an active KEK request may be sent to the KEK database 440. And at 424-2, the active KEK may be sent (in an encrypted format) to the KEK manager 430.

At 426, based on receiving the encrypted active KEK, operations for decrypting the active KEK may be performed. At 426-1, a request for the root KEK may be sent to the key service 415. At 426-2, the root KEK may be sent to the KEK manager 430. Based on obtaining the root KEK, the KEK manager 430 may use the root KEK decrypt the active KEK received from the KEK database 440.

At 428, based on obtaining the plain-text version of the active KEK (e.g., from the cache in the KEK manager 430 or after decrypting the active KEK retrieved from the KEK database 440), the DEK received from the DEK manager may be encrypted using the active KEK.

At 432, the encrypted DEK along with information identifying the KEK used to encrypt the DEK (i.e., the active KEK) may be sent to the DEK manager 425. The KEK used to encrypt the DEK may be referred to as the parent KEK.

At 434, the encrypted DEK and parent KEK information may be sent to the DEK database 435 for storage in an encrypted format. After confirmation the encrypted DEK and parent KEK information was successfully stored in the DEK database, the plain-text DEK may be deleted from the DEK manager.

As discussed herein, the job component 405, the DEK manager 425, the KEK manager 430), the key service 415, and the database 420 may be implemented across multiple computing systems managed by multiple operations. For example, for a first deployment, a first job component may be implemented at a DMS: a first DEK manager and a first KEK manager may be implemented at a computing system; and the key service may be implemented at a second computing system (e.g., a cloud computing system). For a second deployment, a second job component, a second DEK manager and a second KEK manager may all be implemented at the DMS. And, for a third deployment, a third job component, a third DEK manager, and a third KEK manager may all be implemented at the computing system.

In some examples, the database 420 may be implemented using resources managed by a single operator (e.g., at the DMS). Accordingly, regardless of how job components, DEK managers, KEK managers, and the key service are distributed, the database 420 may be used as a unified storage location for DEKs used by the DEK managers and for KEKs used by the KEK managers. Also, the same intermediate KEKs may be used across multiple deployments. Additionally, by installing software for implementing the key manager (the DEK and KEK managers) on different deployments, a uniform mechanism for generating and managing DEKs and KEKs (e.g., common key rotation/rekeying schedules, single-step changing of keys, for example, in response to a security breach and without reencryption of the underlying data, etc.) across the deployment may be achieved.

In some examples, each job that is initiated uses its own instance of the key manager, where an instance of the key manager may include a DEK manager instance and a KEK manager instance. Thus, thousands of DEK manager instances and KEK manager instances may be active at one time. The DEK manager instance may be used to generate DEKs for the job and to store the DEKs in the DEK database. The KEK manager instance may be used to generate KEKs for the job, retrieve KEKs for encrypting/encrypting DEKs for the job, or both. For example, the KEK manager instance may be configured to cache an active KEK used for encrypting the DEKs generated by the DEK manager. In some examples, each KEK instance may cache its own version of the active KEK.

In some examples, a job runs for an extended period (e.g., days or months). Such a job may request multiple DEKs from the DEK manager instance for encrypting different data objects protected by the job. Also, in some examples, the active KEK may change one or more times during the extended period. Accordingly, to prevent the job from continuing to use the cached, but expired active KEK (i.e., no longer the active KEK) to encrypt the DEKs, the KEK manager instance may lease the cached active KEK for a prescribed duration (e.g., 15 minutes). Thus, in accordance with the prescribed duration (e.g., every 15 minutes), the KEK manager instance may check to determine whether the active KEK has changed. If the active KEK has changed, the KEK manager instance may cache the currently active KEK and may use the currently active KEK to decrypt any subsequent DEKs generated by the DEK manager instance.

Aspects of the process diagram 400 may be implemented by a controller, among other components. Additionally, or alternatively, aspects of the process diagram 400 may be implemented as instructions stored in memory (e.g., firmware stored in a memory coupled with a controller). For example, the instructions, when executed by a controller, may cause the controller to perform the operations of the process diagram 400.

One or more of the operations described in the process diagram 400 may be performed earlier or later, omitted, replaced, supplemented, or combined with another operation. Also, additional operations described herein may replace, supplement or be combined with one or more of the operations described in the process diagram 400.

Figure 5:
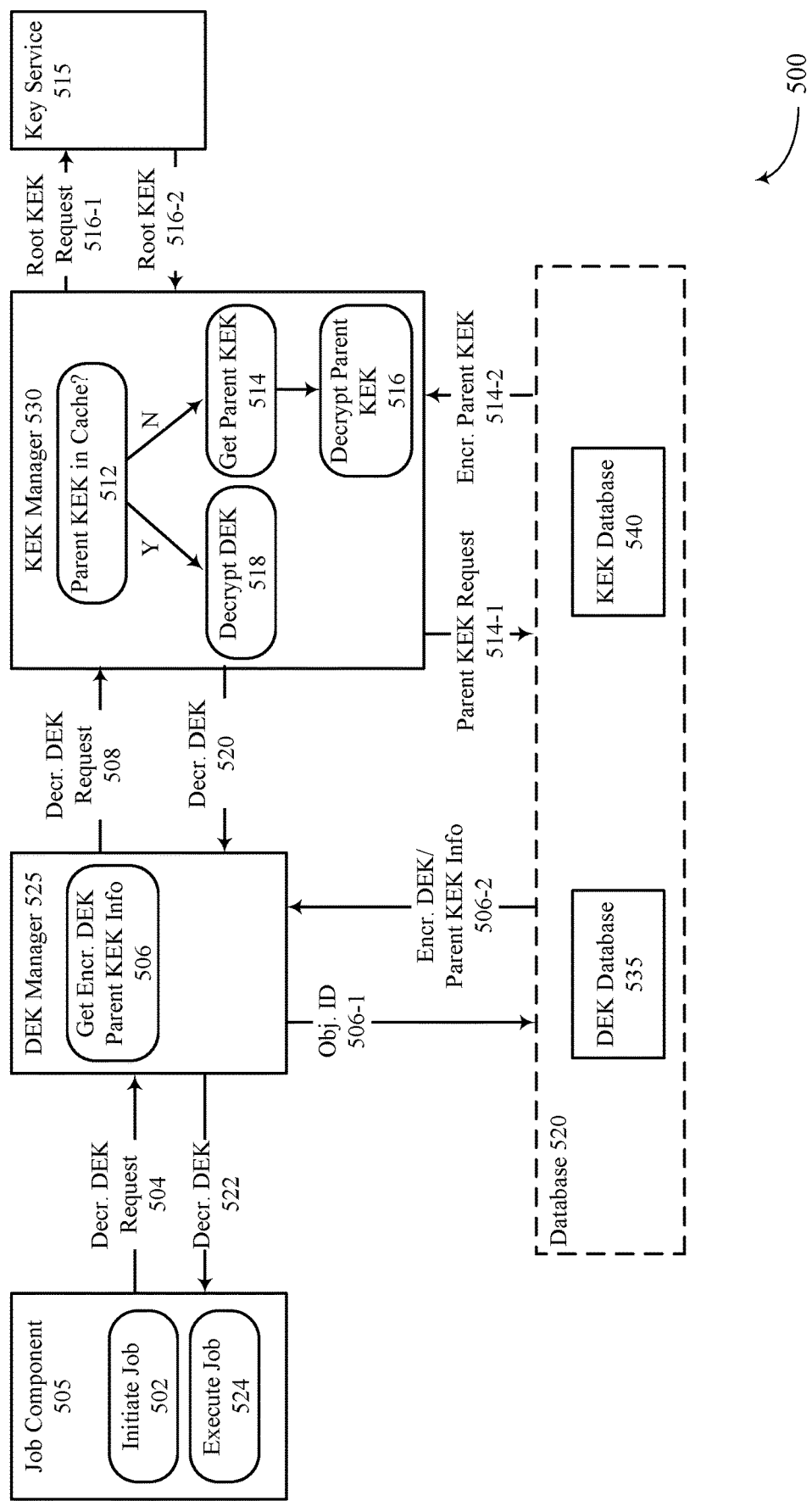
FIG. 5 shows an example of a process diagram that supports unified key management in accordance with aspects of the present disclosure.

FIG. 5 shows an example of a process diagram 500 that supports unified key management in accordance with aspects of the present disclosure. The process diagram 500 may be performed by the job component 505, the DEK manager 525, the KEK manager 530, the key service 515, and the database 520, which may be respective examples of a job component, DEK manager, KEK manager, key service, and database described herein (e.g., the job component 205, the DEK manager 225, the KEK manager 230, the key service 215, and the database 220 of FIG. 2, respectively). Also, the database may include the DEK database 535 and the KEK database 540, which may be respective examples of a DEK database and KEK database described herein (e.g., the DEK database 235 and the KEK database 240 of FIG. 2, respectively).

In some examples, the process diagram 500 illustrates an example set of operations performed to support unified key management. For example, the process diagram 500 may include operations for performing a restore operation that decrypts the restoration data using DEKs and KEKs generated in accordance with the techniques described herein.

At 502, a restoration job may be initiated at the job component 505—e.g., based on the restoration job being pulled from a job queue. The restoration job may be for a particular data object (e.g., a VM, a blob, etc.), the restoration job may execute a restoration operation for the data object using data protection information (e.g., backup or snapshot data) previously created for the data object. In some examples, the data protection information may be encrypted, and the restoration job may be unable to proceed until the data protection information is decrypted.

At 504, a request for a decrypted version of the DEK previously used to encrypt the data protection information may be sent to the DEK manager. The request may include an object identifier that identifies the data object to be restored by the restoration job.

At 506, operations for obtaining the encrypted version of the DEK used to encrypt the data object as well as for obtaining information regarding the intermediate KEK (the parent KEK) used to encrypt the DEK may be performed. At 506-1, the object identifier for the data object may be sent to the DEK database 535. At 506-2, the encrypted DEK corresponding to the data object and an indication of the parent KEK use to encrypt the retrieved DEK may be received.

At 508, the encrypted DEK and the parent KEK information retrieved from the DEK database 535 may be sent to the KEK manager 530 in a request to decrypt the encrypted DEK.

At 512, a determination of whether the parent KEK is stored in a cache at the KEK manager 530 may be made. In some examples, the parent KEK may be stored in the cache in a plain-text format.

At 514, based on determining that the parent KEK is not cached at the KEK manager 430, operations for obtaining the parent KEK may be performed. At 514-1, a request for the parent KEK may be sent to the KEK database 540. At 514-2, an encrypted version of the parent KEK may be received (in an encrypted format) from the KEK database 540.

At 516, based on receiving the encrypted parent KEK, operations for decrypting the parent KEK may be performed. At 516-1, a request for the root KEK may be sent to the key service 515. At 516-2, the root KEK may be received from the key service. Based on obtaining the root KEK, the KEK manager 530 may use the root KEK to decrypt the parent KEK received from the KEK database 540.

At 518, based on obtaining the plain-text version of the parent KEK (e.g., from the cache in the KEK manager 530 or after decrypting the parent KEK retrieved from the KEK database 540), the DEK received from the DEK manager may be decrypted using the parent KEK.

At 520, the decrypted (plain-text) DEK may be sent to the DEK manager 525.

At 522, the decrypted (plain-text) DEK may be sent to the job component 505.

At 524, the restoration job may be executed based on receiving the decrypted DEK. Prior to executing the restoration job, the restoration job may use the decrypted DEK to decrypt the data protection data being used for the restoration procedure.

Aspects of the process diagram 500 may be implemented by a controller, among other components. Additionally, or alternatively, aspects of the process diagram 500 may be implemented as instructions stored in memory (e.g., firmware stored in a memory coupled with a controller). For example, the instructions, when executed by a controller, may cause the controller to perform the operations of the process diagram 500.

One or more of the operations described in the process diagram 500 may be performed earlier or later, omitted, replaced, supplemented, or combined with another operation. Also, additional operations described herein may replace, supplement or be combined with one or more of the operations described in the process diagram 500.

Figure 6:
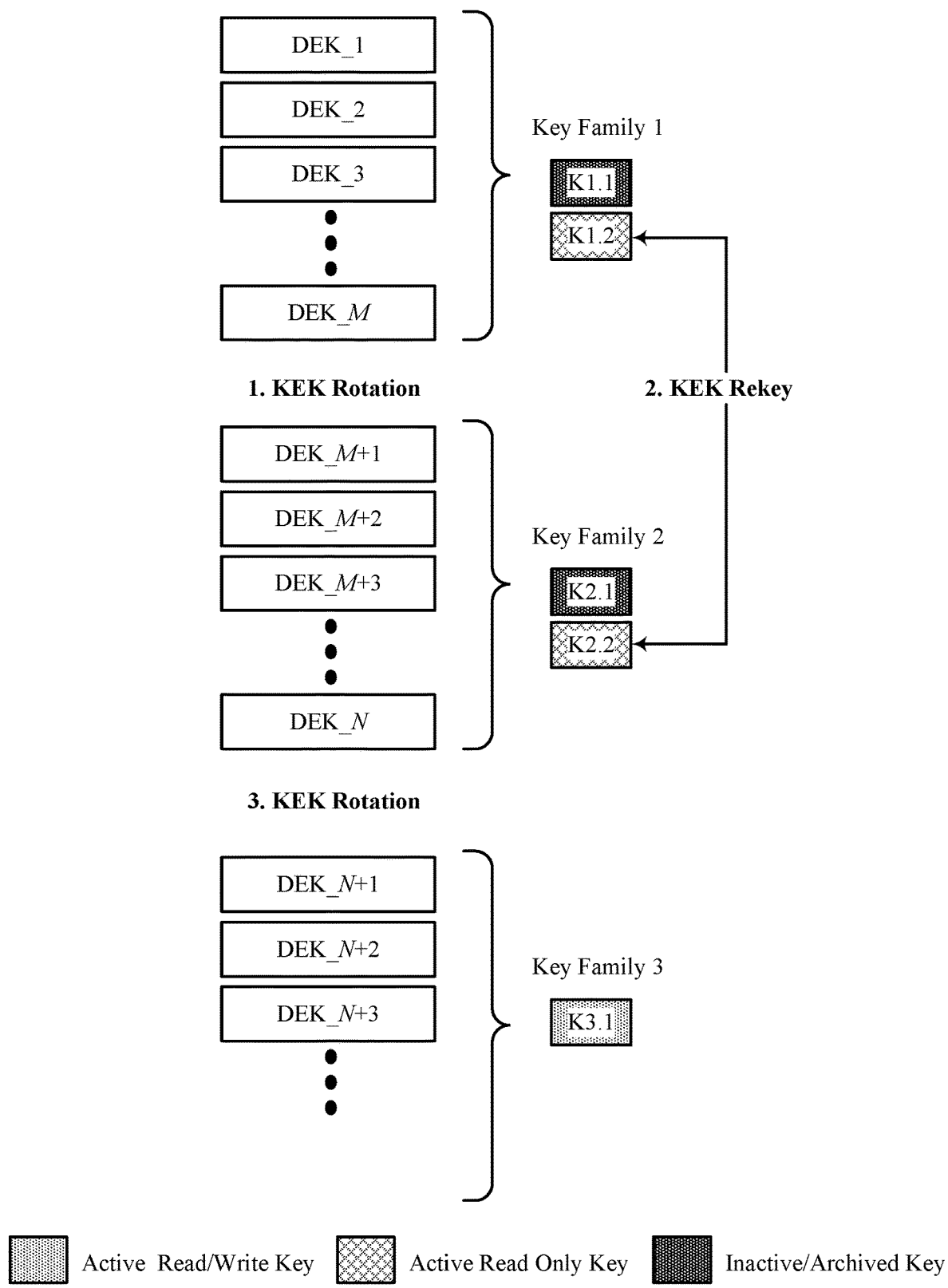
FIG. 6 shows an example of a key diagram that supports unified key management in accordance with aspects of the present disclosure.

FIG. 6 shows an example of a key diagram 600 that supports unified key management in accordance with aspects of the present disclosure. The key diagram 600 may depict a correspondence between intermediate KEKs and DEKs encrypted using the intermediate KEKs at different stages of KEK rotation and KEK rekeying.

For example, during the time period depicted in the key diagram 600, KEK 3.1 is the active KEK due to the preceding KEK rotation operation (labeled in the drawing as 3. KEK Rotation). Thus DEK_N+1 and subsequent DEKs (DEK_N+2, DEK_N+3, and so on) that are generated during that time period are encrypted using KEK 3.1.

During a prior time period in which DEKs M+1 through N were generated, KEK 2.1 was the active KEK, and hence DEKs M+1 through N were initially encrypted using KEK 2.1. But as part of a subsequent KEK rekeying operation (labeled in the drawing as 2. KEK Rekey), DEKs M+1 through N were re-encrypted using KEK 2.2. Thus, during the time period depicted in the key diagram 600, KEK 2.1 has become an inactive/archived KEK, and KEK 2.2 is the active read-only KEK for DEKs M+1 through N.

During an even earlier time period in which DEKs 1 through M were generated (prior to the KEK rotation operation labeled in the drawing as 1. KEK Rotation), KEK 1.1 was the active KEK (as KEK 2.1 did not become the active KEK until after the 1. KEK Rotation operation). Hence, DEKs 1 through M were initially encrypted using KEK 1.1. But as part of the subsequent KEK rekeying operation (labeled in the drawing as 2. KEK Rekey), DEKs 1 through M were re-encrypted using KEK 1.2. Thus, during the time period depicted in the key diagram 600, KEK 1.1 has become an inactive/archived KEK, and KEK 1.2 is the active read-only KEK for DEKs 1 through M.

Figure 7:
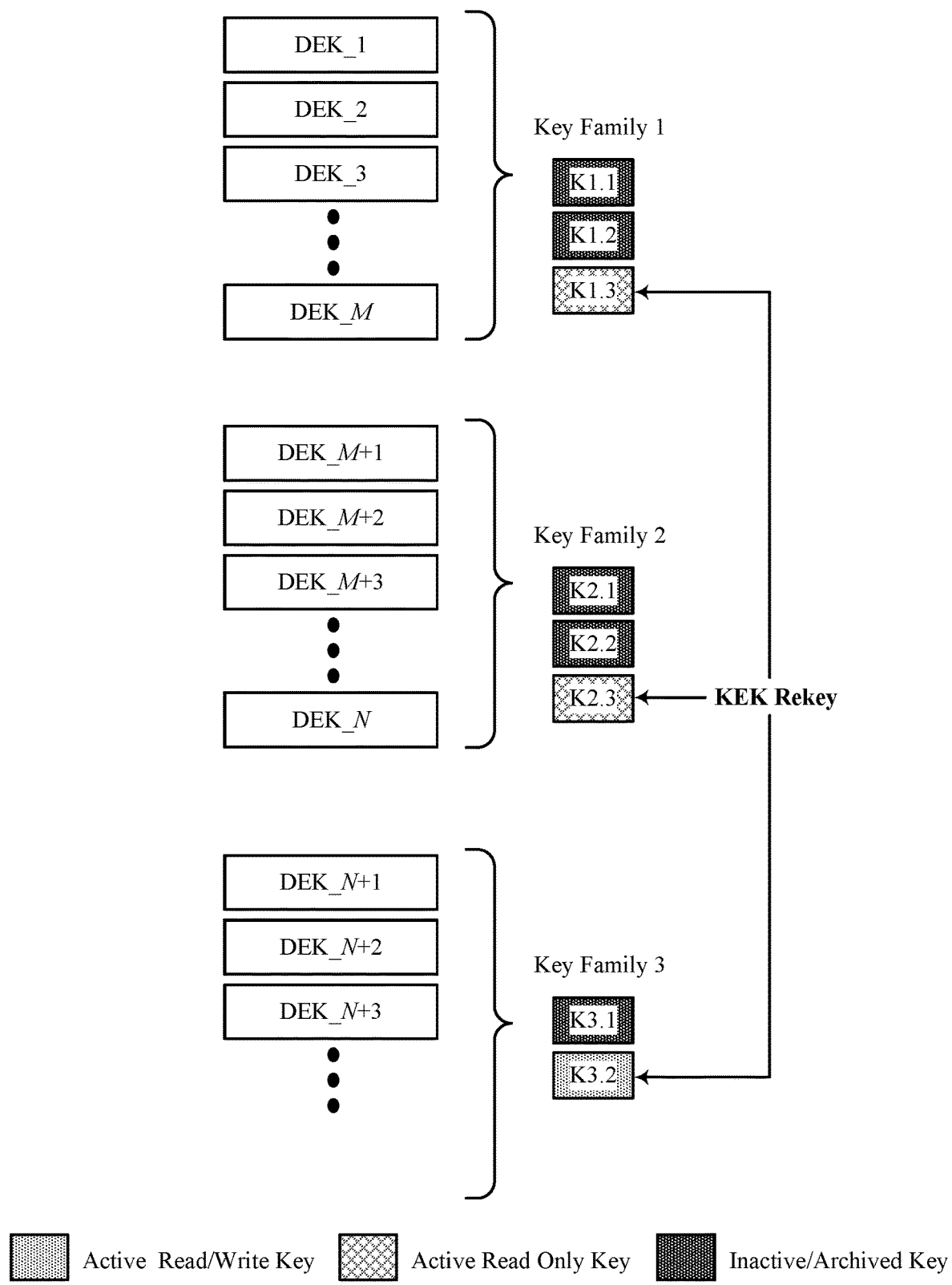
FIG. 7 shows an example of a key diagram that supports unified key management in accordance with aspects of the present disclosure.

FIG. 7 shows an example of a key diagram 700 that supports unified key management in accordance with aspects of the present disclosure. The key diagram 700 may depict a correspondence between intermediate KEKs and DEKs encrypted using the intermediate KEKs after KEK rekeying. The time period depicted in the key diagram 700 may be after the time period depicted in the key diagram 600 of FIG. 6, subsequent to the KEK rekeying operation labeled in the drawing as KEK Rekey. As part of the KEK Rekey operation, DEKs 1 through M were re-encrypted using KEK 1.3, DEKs M+1 through N were re-encrypted using KEK 2.3, and DEKs N+1, N+2, N+3, and so on were re-encrypted using KEK 3.2. Thus, as of the time period depicted in the key diagram 700, KEKs 1.2, 2.2, and 3.1 have become inactive/archived KEKs, while KEKs 1.3 and 2.3 are active read-only KEKs for their corresponding DEKs, and while KEK 3.2 is the active KEK.

Figure 8:
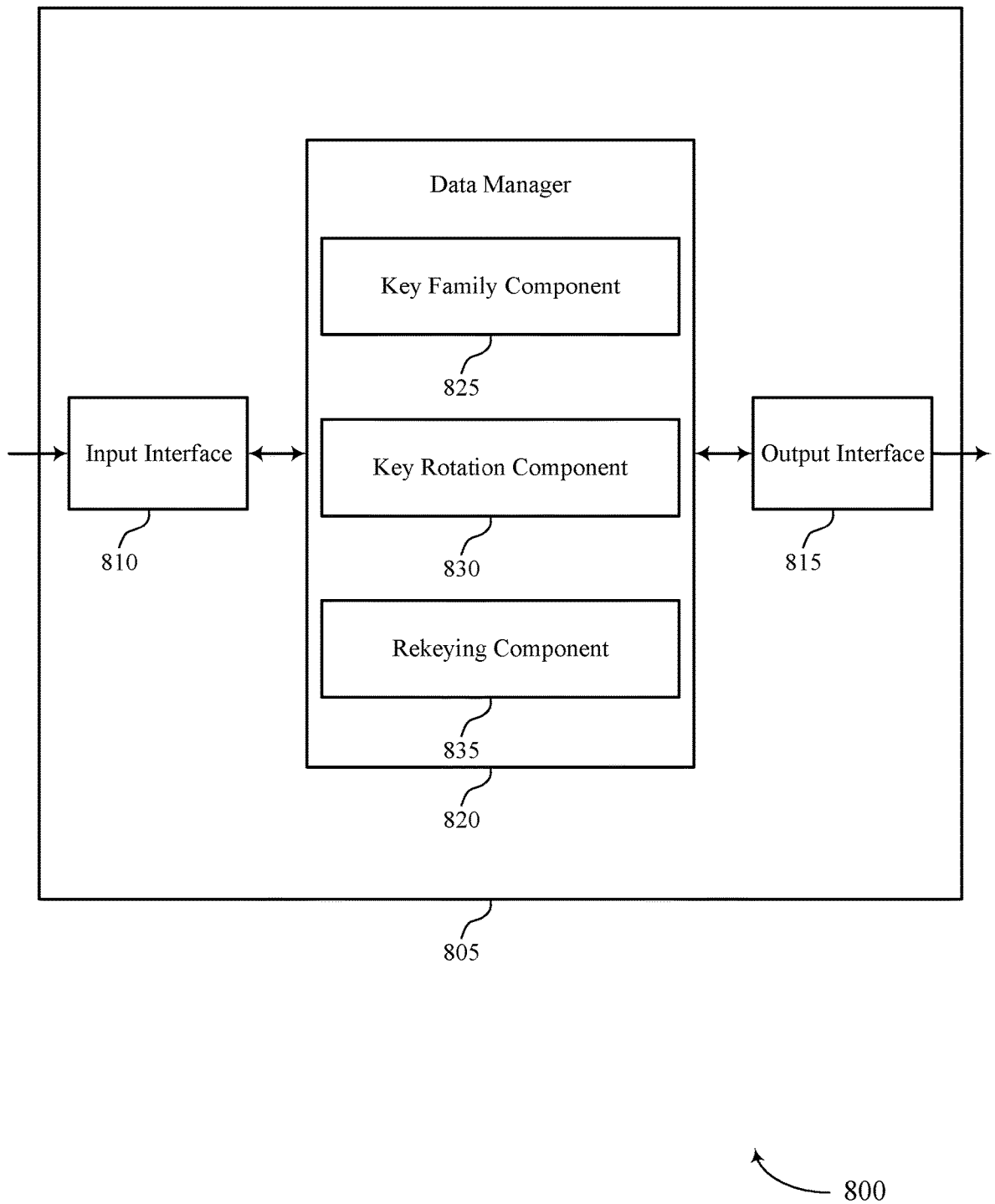
FIG. 8 shows a block diagram of an apparatus that supports unified key management in accordance with aspects of the present disclosure.

FIG. 8 shows a block diagram 800 of a system 805 that supports unified key management in accordance with aspects of the present disclosure. In some examples, the system 805 may be an example of aspects of one or more components described with reference to FIG. 1, such as a DMS 110. The system 805 may include an input interface 810, an output interface 815, and a data manager 820. The system 805 may also include one or more processors. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the data manager 820 to support unified key management. In some cases, the input interface 810 may be a component of a network interface 1025 as described with reference to FIG. 10.

The output interface 815 may manage output signaling for the system 805. For example, the output interface 815 may receive signaling from other components of the system 805, such as the data manager 820, and may transmit such output signaling corresponding to (e.g., representative of or otherwise based on) such signaling to other systems or devices. In some cases, the output interface 815 may be a component of a network interface 1025 as described with reference to FIG. 10.

For example, the data manager 820 may include a key family component 825, a key rotation component 830, a rekeying component 835, or any combination thereof. In some examples, the data manager 820, or various components thereof, may be configured to perform various operations (e.g., receiving, monitoring, transmitting) using or otherwise in cooperation with the input interface 810, the output interface 815, or both. For example, the data manager 820 may receive information from the input interface 810, send information to the output interface 815, or be integrated in combination with the input interface 810, the output interface 815, or both to receive information, transmit information, or perform various other operations as described herein.

The key family component 825 may be configured as or otherwise support a means for creating a first key family, where a first key of the first key family is used to encrypt and decrypt first data encryption keys associated with one or more first data management jobs. The key rotation component 830 may be configured as or otherwise support a means for creating, as part of a key rotation operation, a second key family after encrypting the first data encryption keys using the first key of the first key family, where a first key of the second key family is used to encrypt and decrypt second data encryption keys that are associated with one or more second data management jobs that occur after the one or more first data management jobs. The rekeying component 835 may be configured as or otherwise support a means for creating, as part of a rekeying operation, a second key of the first key family and a second key of the second key family. In some examples, the second key of the first key family is used to decrypt the first data encryption keys, and the second key of the second key family is used to encrypt third data encryption keys and to decrypt the second data encryption keys and the third data encryption keys, the third data encryption keys associated with one or more third data management jobs that occur after the one or more second data management jobs.

Figure 9:
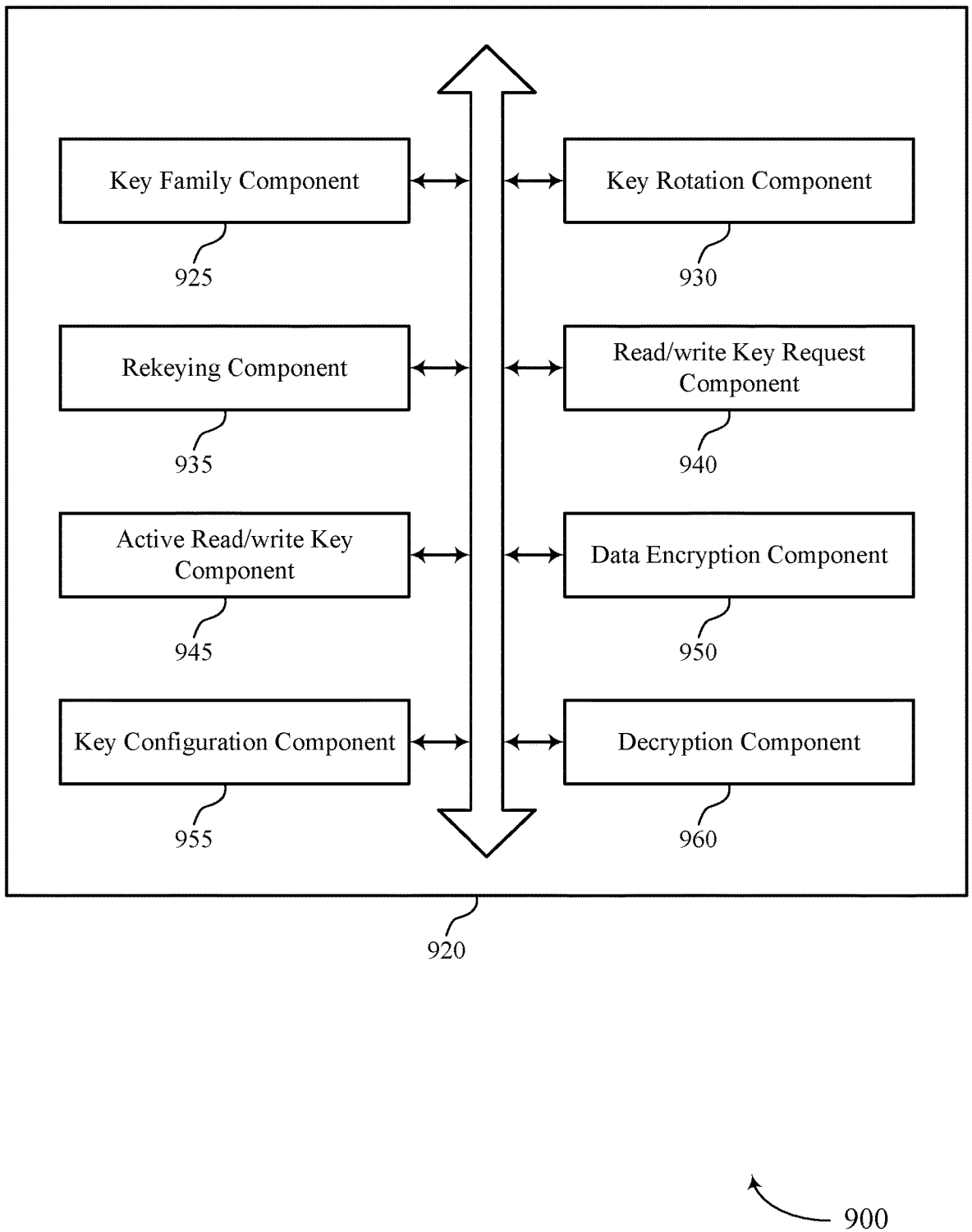
FIG. 9 shows a block diagram of a data manager that supports unified key management in accordance with aspects of the present disclosure.

FIG. 9 shows a block diagram 900 of a data manager 920 that supports unified key management in accordance with aspects of the present disclosure. The data manager 920 may be an example of aspects of a data manager or a data manager 820, or both, as described herein. The data manager 920, or various components thereof, may be an example of means for performing various aspects of unified key management as described herein. For example, the data manager 920 may include a key family component 925, a key rotation component 930, a rekeying component 935, a read/write key request component 940, an active read/write key component 945, a data encryption component 950, a key configuration component 955, a decryption component 960, or any combination thereof. Each of these components may communicate, directly or indirectly, with one another (e.g., via one or more buses, communications links, communications interfaces, or any combination thereof).

The key family component 925 may be configured as or otherwise support a means for creating a first key family, where a first key of the first key family is used to encrypt and decrypt first data encryption keys associated with one or more first data management jobs. The key rotation component 930 may be configured as or otherwise support a means for creating, as part of a key rotation operation, a second key family after encrypting the first data encryption keys using the first key of the first key family, where a first key of the second key family is used to encrypt and decrypt second data encryption keys that are associated with one or more second data management jobs that occur after the one or more first data management jobs. The rekeying component 935 may be configured as or otherwise support a means for creating, as part of a rekeying operation, a second key of the first key family and a second key of the second key family. In some examples, the second key of the first key family is used to decrypt the first data encryption keys, and the second key of the second key family is used to encrypt third data encryption keys and to decrypt the second data encryption keys and the third data encryption keys, the third data encryption keys associated with one or more third data management jobs that occur after the one or more second data management jobs.

In some examples, the read/write key request component 940 may be configured as or otherwise support a means for receiving, after the rekeying operation, a request for an active read/write key. In some examples, the active read/write key component 945 may be configured as or otherwise support a means for sending, in response to the request, the second key of the second key family as the active read/write key, where the second key of the second key family is in an encrypted format.

In some examples, the request is received from an instance of a key manager that is associated with a data protection job, the data protection job configured to encrypt data protection information generated by the data protection job with a data encryption key and to encrypt the data encryption key with the active read/write key.

In some examples, the data encryption component 950 may be configured as or otherwise support a means for receiving, from the instance of the key manager and based on sending the second key of the second key family, a version of the data encryption key that has been encrypted using the second key of the second key family and an indication that the data encryption key was encrypted with the second key of the second key family. In some examples, the data encryption component 950 may be configured as or otherwise support a means for storing the version of the data encryption key and the indication that the data encryption key was encrypted with the second key of the second key family.

In some examples, the active read/write key component 945 may be configured as or otherwise support a means for indicating a lease duration for the active read/write key, where a lease of the active read/write key expires at an end of the lease duration. In some examples, the active read/write key component 945 may be configured as or otherwise support a means for receiving, at the end of the lease duration, a second request for the active read/write key.

In some examples, the rekeying component 935 may be configured as or otherwise support a means for creating, as part of a second rekeying operation that occurs after the rekeying operation and before the end of the lease duration, a third key of the first key family and a third key of the second key family. In some examples, the rekeying component 935 may be configured as or otherwise support a means for sending, in response to the second request and based on the second rekeying operation, the third key of the second key family.

In some examples, the data encryption component 950 may be configured as or otherwise support a means for receiving, after the rekeying operation, a request for a data encryption key used to encrypt data protection information generated for a data object by a data protection job included in the one or more first data management jobs, the request including an ID of the data object. In some examples, the data encryption component 950 may be configured as or otherwise support a means for sending, in response to the request and based on the ID of the data object, the data encryption key and an indication of a key used to encrypt the data encryption key, where the data encryption key is in an encrypted format.

In some examples, the data encryption component 950 may be configured as or otherwise support a means for receiving, based on sending the data encryption key and the indication of the key used to encrypt the data encryption key, a second request for the key used to encrypt the data encryption key. In some examples, the data encryption component 950 may be configured as or otherwise support a means for sending, in response to the second request and based on the indication of the key used to encrypt the data encryption key, the second key of the first key family as the key used to encrypt the data encryption key, where the second key of the first key family is in the encrypted format and is a read-only key.

In some examples, the request is received from an instance of a key manager that is instantiated for a data restoration job.

In some examples, the key family component 925 may be configured as or otherwise support a means for storing the first key family and the second key family at a storage location within a first computing system managed by a first operator. In some examples, the active read/write key component 945 may be configured as or otherwise support a means for receiving, after the rekeying operation, a request for an active read/write key, where the request is received from a key manager implemented at a second computing system managed by a second operator.

In some examples, the key rotation component 930 may be configured as or otherwise support a means for creating, as part of a second key rotation operation that occurs after the rekeying operation, a third key family after the rekeying operation. In some examples, the second key of the first key family is used to decrypt the first data encryption keys, the second key of the second key family is used to decrypt the second data encryption keys and the third data encryption keys, and a first key of the third key family is used to encrypt and decrypt fourth data encryption keys that are associated with one or more fourth data management jobs that occur after the one or more third data management jobs.

In some examples, the rekeying component 935 may be configured as or otherwise support a means for creating, as part of a second rekeying operation that occurs after the second key rotation operation, a third key of the first key family, a third key of the second key family, and a second key of the third key family. In some examples, the third key of the first key family is used to decrypt the first data encryption keys, the third key of the second key family is used to decrypt the second data encryption keys and the third data encryption keys, and the second key of the third key family is used to encrypt fifth data encryption keys and to decrypt the fourth data encryption keys and the fifth data encryption keys, the fifth data encryption keys associated with one or more fifth data management jobs that occur after the one or more fourth data management jobs.

In some examples, the rekeying component 935 may be configured as or otherwise support a means for creating, as part of a second rekeying operation that occurs after the rekeying operation, a third key of the first key family and a third key of the second key family. In some examples, the third key of the first key family is used to decrypt the first data encryption keys and the third key of the second key family is used to encrypt fourth data encryption keys and to decrypt the third data encryption keys and the fourth data encryption keys, the fourth data encryption keys associated with one or more fourth data management jobs that occur after the one or more third data management jobs.

In some examples, the key family component 925 may be configured as or otherwise support a means for creating one or more higher-layer key families including higher-level key encryption keys used to encrypt and decrypt lower-level key encryption keys that are used to encrypt data encryption keys, the lower-level key encryption keys including the first key family and the second key family, and the data encryption keys including the first data encryption keys, the second data encryption keys, and the third data encryption keys.

In some examples, the data encryption component 950 may be configured as or otherwise support a means for receiving, from a customer and prior to creating the second key family, one or more keys for encrypting data encryption keys, where the first key of the second key family, the second key of the first key family, and the second key of the second key family are selected from the one or more keys received from the customer.

In some examples, the key configuration component 955 may be configured as or otherwise support a means for configuring, after the key rotation operation, the first key of the first key family to be in a read-only state and the first key of the second key family to be in an active read/write state, where the first key of the first key family is configured for decrypting the first data encryption keys encrypted by the first key family based on being in the read-only state. In some examples, the key configuration component 955 may be configured as or otherwise support a means for configuring, after the rekeying operation, the first key of the first key family to be in an inactive state, the second key of the first key family to be in the read-only state, the first key of the second key family to be in the inactive state, and the second key of the second key family to be in the active read/write state, where the second key of the first key family is configured for decrypting the first data encryption keys encrypted by the first key family based on being in the read-only state.

In some examples, as part of the rekeying operation, the decryption component 960 may be configured as or otherwise support a means for decrypting the first data encryption keys using the first key of the first key family to obtain plain-text versions of the first data encryption keys and encrypting the plain-text versions of the first data encryption keys using the second key of the first key family. In some examples, as part of the rekeying operation, the decryption component 960 may be configured as or otherwise support a means for decrypting the second data encryption keys using the first key of the second key family to obtain plain-text versions of the second data encryption keys and encrypting the plain-text versions of the second data encryption keys using the second key of the second key family.

Figure 10:
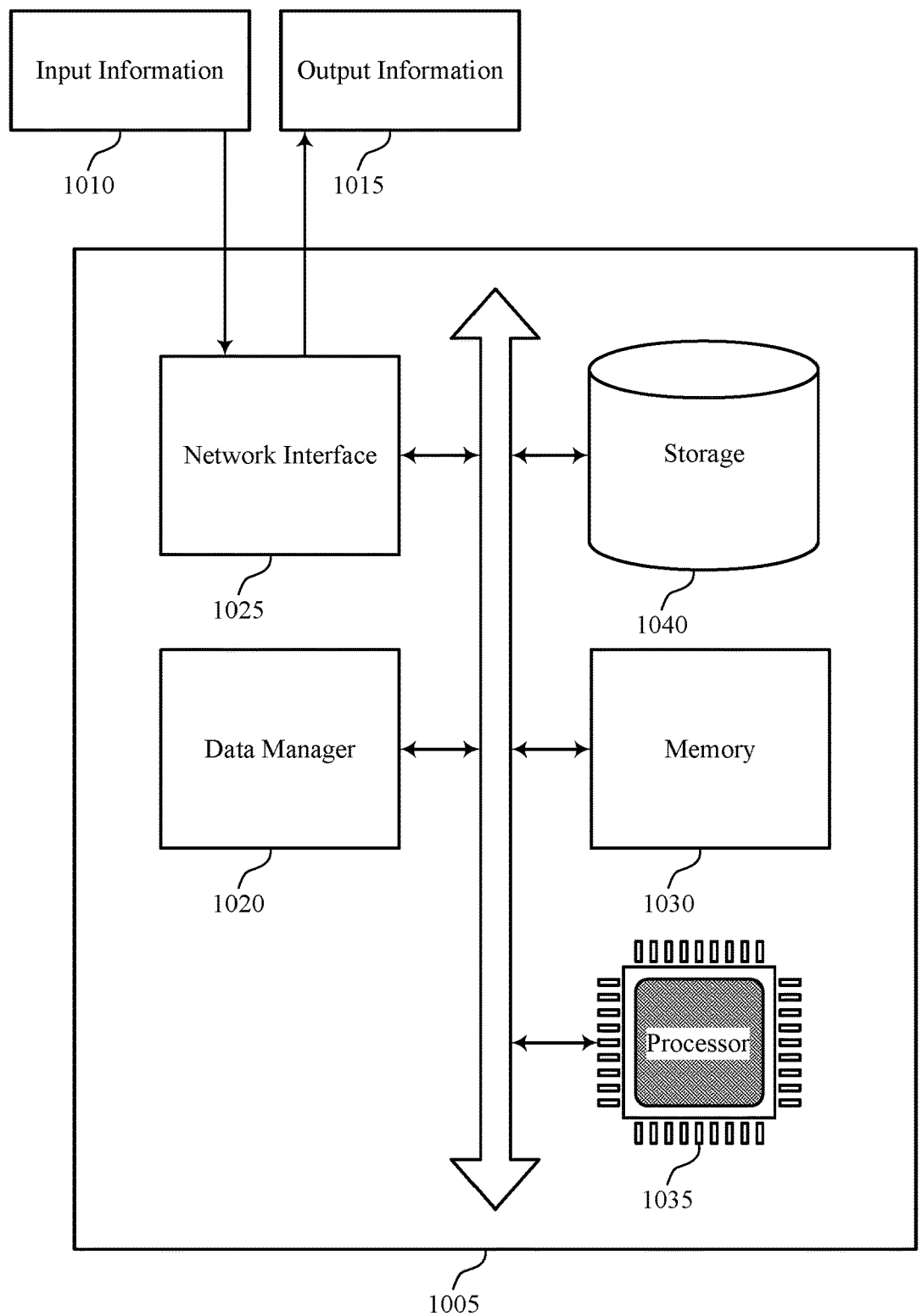
FIG. 10 shows a diagram of a system including a device that supports unified key management in accordance with aspects of the present disclosure.

FIG. 10 shows a block diagram 1000 of a system 1005 that supports unified key management in accordance with aspects of the present disclosure. The system 1005 may be an example of or include the components of a system 805 as described herein. The system 1005 may include components for data management, including components such as a data manager 1020, an input information 1010, an output information 1015, a network interface 1025, a memory 1030, a processor 1035, and a storage 1040. These components may be in electronic communication or otherwise coupled with each other (e.g., operatively, communicatively, functionally, electronically, electrically: via one or more buses, communications links, communications interfaces, or any combination thereof). Additionally, the components of the system 1005 may include corresponding physical components or may be implemented as corresponding virtual components (e.g., components of one or more virtual machines). In some examples, the system 1005 may be an example of aspects of one or more components described with reference to FIG. 1, such as a DMS 110.

The network interface 1025 may enable the system 1005 to exchange information (e.g., input information 1010, output information 1015, or both) with other systems or devices (not shown). For example, the network interface 1025 may enable the system 1005 to connect to a network (e.g., a network 120 as described herein). The network interface 1025 may include one or more wireless network interfaces, one or more wired network interfaces, or any combination thereof. In some examples, the network interface 1025 may be an example of may be an example of aspects of one or more components described with reference to FIG. 1, such as one or more network interfaces 165.

Memory 1030 may include RAM, ROM, or both. The memory 1030 may store computer-readable, computer-executable software including instructions that, when executed, cause the processor 1035 to perform various functions described herein. In some cases, the memory 1030 may contain, among other things, a basic input/output system (BIOS), which may control basic hardware or software operation such as the interaction with peripheral components or devices. In some cases, the memory 1030 may be an example of aspects of one or more components described with reference to FIG. 1, such as one or more memories 175.

The processor 1035 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 1035 may be configured to execute computer-readable instructions stored in a memory 1030 to perform various functions (e.g., functions or tasks supporting unified key management). Though a single processor 1035 is depicted in the example of FIG. 10, it is to be understood that the system 1005 may include any quantity of one or more of processors 1035 and that a group of processors 1035 may collectively perform one or more functions ascribed herein to a processor, such as the processor 1035. In some cases, the processor 1035 may be an example of aspects of one or more components described with reference to FIG. 1, such as one or more processors 170.

Storage 1040 may be configured to store data that is generated, processed, stored, or otherwise used by the system 1005. In some cases, the storage 1040 may include one or more HDDs, one or more SDDs, or both. In some examples, the storage 1040 may be an example of a single database, a distributed database, multiple distributed databases, a data store, a data lake, or an emergency backup database. In some examples, the storage 1040 may be an example of one or more components described with reference to FIG. 1, such as one or more network disks 180.

For example, the data manager 1020 may be configured as or otherwise support a means for creating a first key family, where a first key of the first key family is used to encrypt and decrypt first data encryption keys associated with one or more first data management jobs. The data manager 1020 may be configured as or otherwise support a means for creating, as part of a key rotation operation, a second key family after encrypting the first data encryption keys using the first key of the first key family, where a first key of the second key family is used to encrypt and decrypt second data encryption keys that are associated with one or more second data management jobs that occur after the one or more first data management jobs. The data manager 1020 may be configured as or otherwise support a means for creating, as part of a rekeying operation, a second key of the first key family and a second key of the second key family. In some examples, the second key of the first key family is used to decrypt the first data encryption keys, and the second key of the second key family is used to encrypt third data encryption keys and to decrypt the second data encryption keys and the third data encryption keys, the third data encryption keys associated with one or more third data management jobs that occur after the one or more second data management jobs.

By including or configuring the data manager 1020 in accordance with examples as described herein, the system 1005 may support techniques for unified key management, which may provide one or more benefits such as, for example, improved reliability, reduced latency, more efficient utilization of computing resources, network resources or both, improved scalability, or improved security, among other possibilities.

Figure 11:
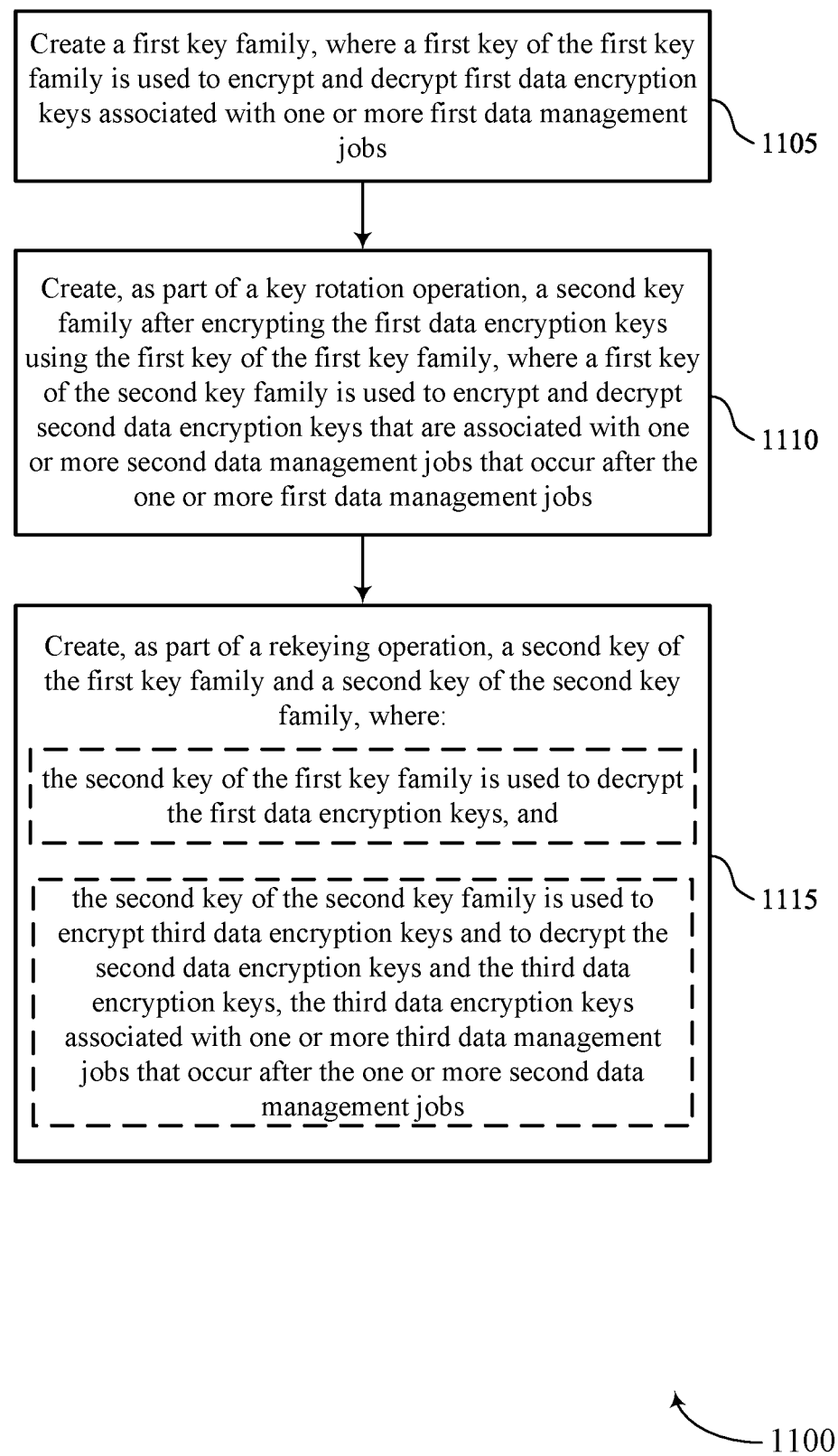
FIGS. 11 through 13 show flowcharts illustrating methods that support unified key management in accordance with aspects of the present disclosure.

FIG. 11 shows a flowchart illustrating a method 1100 that supports unified key management in accordance with aspects of the present disclosure. The operations of the method 1100 may be implemented by a DMS or its components as described herein. For example, the operations of the method 1100 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1105, the method may include creating a first key family, where a first key of the first key family is used to encrypt and decrypt first data encryption keys associated with one or more first data management jobs. The operations of 1105 may be performed in accordance with examples as disclosed herein. In some examples, aspects of the operations of 1105 may be performed by a key family component 925 as described with reference to FIG. 9.

At 1110, the method may include creating, as part of a key rotation operation, a second key family after encrypting the first data encryption keys using the first key of the first key family, where a first key of the second key family is used to encrypt and decrypt second data encryption keys that are associated with one or more second data management jobs that occur after the one or more first data management jobs. The operations of 1110 may be performed in accordance with examples as disclosed herein. In some examples, aspects of the operations of 1110 may be performed by a key rotation component 930 as described with reference to FIG. 9.

At 1115, the method may include creating, as part of a rekeying operation, a second key of the first key family and a second key of the second key family, where the second key of the first key family is used to decrypt the first data encryption keys and the second key of the second key family is used to encrypt third data encryption keys and to decrypt the second data encryption keys and the third data encryption keys, the third data encryption keys associated with one or more third data management jobs that occur after the one or more second data management jobs. The operations of 1115 may be performed in accordance with examples as disclosed herein. In some examples, aspects of the operations of 1115 may be performed by a rekeying component 935 as described with reference to FIG. 9.

Figure 12:
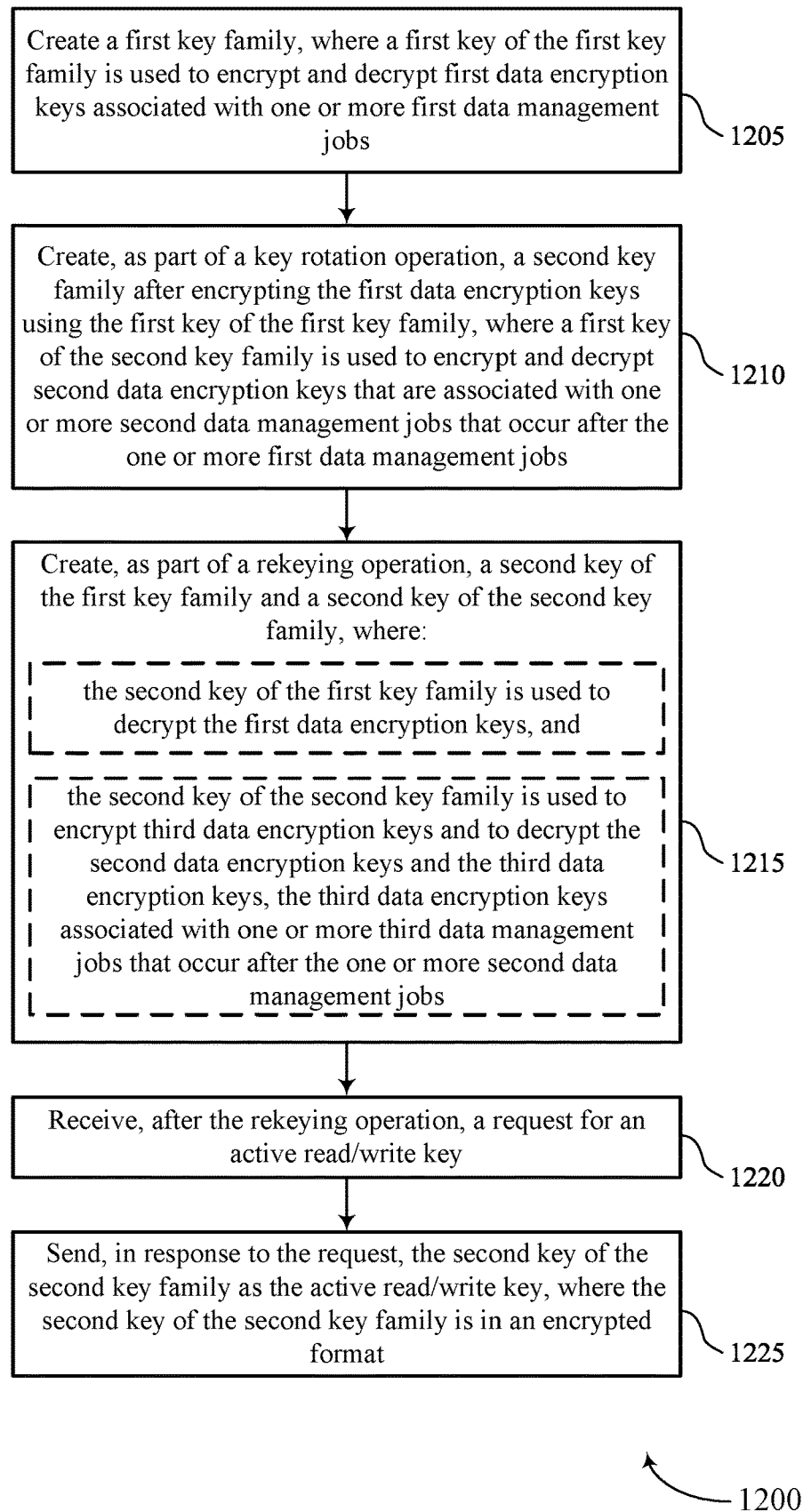

FIG. 12 shows a flowchart illustrating a method 1200 that supports unified key management in accordance with aspects of the present disclosure. The operations of the method 1200 may be implemented by a DMS or its components as described herein. For example, the operations of the method 1200 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1205, the method may include creating a first key family, where a first key of the first key family is used to encrypt and decrypt first data encryption keys associated with one or more first data management jobs. The operations of 1205 may be performed in accordance with examples as disclosed herein. In some examples, aspects of the operations of 1205 may be performed by a key family component 925 as described with reference to FIG. 9.

At 1210, the method may include creating, as part of a key rotation operation, a second key family after encrypting the first data encryption keys using the first key of the first key family, where a first key of the second key family is used to encrypt and decrypt second data encryption keys that are associated with one or more second data management jobs that occur after the one or more first data management jobs. The operations of 1210 may be performed in accordance with examples as disclosed herein. In some examples, aspects of the operations of 1210 may be performed by a key rotation component 930 as described with reference to FIG. 9.

At 1215, the method may include creating, as part of a rekeying operation, a second key of the first key family and a second key of the second key family, where the second key of the first key family is used to decrypt the first data encryption keys and the second key of the second key family is used to encrypt third data encryption keys and to decrypt the second data encryption keys and the third data encryption keys, the third data encryption keys associated with one or more third data management jobs that occur after the one or more second data management jobs. The operations of 1215 may be performed in accordance with examples as disclosed herein. In some examples, aspects of the operations of 1215 may be performed by a rekeying component 935 as described with reference to FIG. 9.

At 1220, the method may include receiving, after the rekeying operation, a request for an active read/write key. The operations of 1220 may be performed in accordance with examples as disclosed herein. In some examples, aspects of the operations of 1220 may be performed by a read/write key request component 940 as described with reference to FIG. 9.

At 1225, the method may include sending, in response to the request, the second key of the second key family as the active read/write key, where the second key of the second key family is in an encrypted format. The operations of 1225 may be performed in accordance with examples as disclosed herein. In some examples, aspects of the operations of 1225 may be performed by an active read/write key component 945 as described with reference to FIG. 9.

Figure 13:
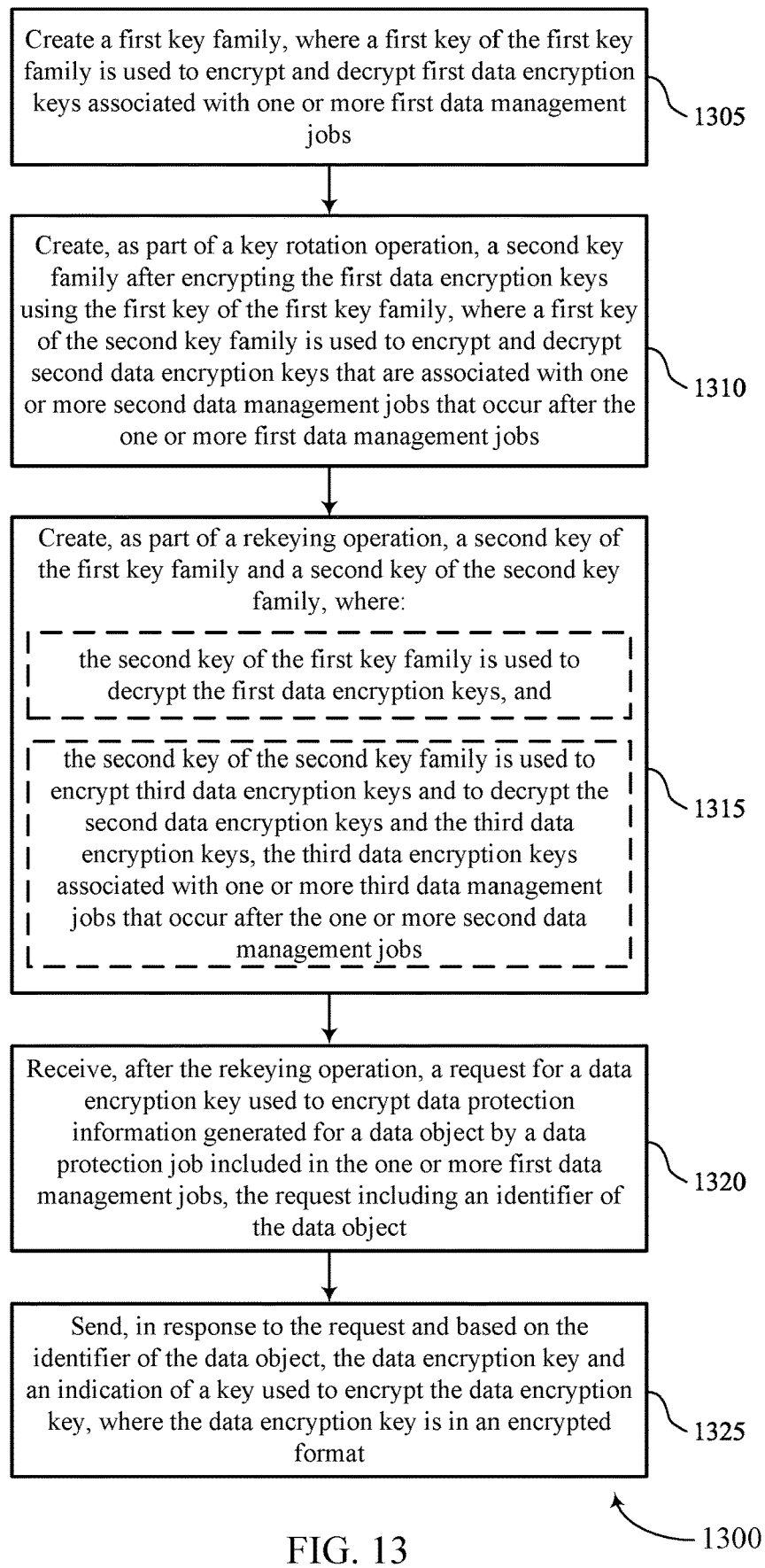

FIG. 13 shows a flowchart illustrating a method 1300 that supports unified key management in accordance with aspects of the present disclosure. The operations of the method 1300 may be implemented by a DMS or its components as described herein. For example, the operations of the method 1300 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1305, the method may include creating a first key family, where a first key of the first key family is used to encrypt and decrypt first data encryption keys associated with one or more first data management jobs. The operations of 1305 may be performed in accordance with examples as disclosed herein. In some examples, aspects of the operations of 1305 may be performed by a key family component 925 as described with reference to FIG. 9.

At 1310, the method may include creating, as part of a key rotation operation, a second key family after encrypting the first data encryption keys using the first key of the first key family, where a first key of the second key family is used to encrypt and decrypt second data encryption keys that are associated with one or more second data management jobs that occur after the one or more first data management jobs. The operations of 1310 may be performed in accordance with examples as disclosed herein. In some examples, aspects of the operations of 1310 may be performed by a key rotation component 930 as described with reference to FIG. 9.

At 1315, the method may include creating, as part of a rekeying operation, a second key of the first key family and a second key of the second key family, where the second key of the first key family is used to decrypt the first data encryption keys and the second key of the second key family is used to encrypt third data encryption keys and to decrypt the second data encryption keys and the third data encryption keys, the third data encryption keys associated with one or more third data management jobs that occur after the one or more second data management jobs. The operations of 1315 may be performed in accordance with examples as disclosed herein. In some examples, aspects of the operations of 1315 may be performed by a rekeying component 935 as described with reference to FIG. 9.

At 1320, the method may include receiving, after the rekeying operation, a request for a data encryption key used to encrypt data protection information generated for a data object by a data protection job included in the one or more first data management jobs, the request including an ID of the data object. The operations of 1320 may be performed in accordance with examples as disclosed herein. In some examples, aspects of the operations of 1320 may be performed by a data encryption component 950 as described with reference to FIG. 9.

At 1325, the method may include sending, in response to the request and based on the ID of the data object, the data encryption key and an indication of a key used to encrypt the data encryption key, where the data encryption key is in an encrypted format. The operations of 1325 may be performed in accordance with examples as disclosed herein. In some examples, aspects of the operations of 1325 may be performed by a data encryption component 950 as described with reference to FIG. 9.

A method is described. The method may include creating a first key family, where a first key of the first key family is used to encrypt and decrypt first data encryption keys associated with one or more first data management jobs, creating, as part of a key rotation operation, a second key family after encrypting the first data encryption keys using the first key of the first key family, where a first key of the second key family is used to encrypt and decrypt second data encryption keys that are associated with one or more second data management jobs that occur after the one or more first data management jobs, and creating, as part of a rekeying operation, a second key of the first key family and a second key of the second key family, where the second key of the first key family is used to decrypt the first data encryption keys, and the second key of the second key family is used to encrypt third data encryption keys and to decrypt the second data encryption keys and the third data encryption keys, the third data encryption keys associated with one or more third data management jobs that occur after the one or more second data management jobs.

An apparatus is described. The apparatus may include a processor, memory coupled with the processor, and instructions stored in the memory. The instructions may be executable by the processor to cause the apparatus to create a first key family, where a first key of the first key family is used to encrypt and decrypt first data encryption keys associated with one or more first data management jobs, create, as part of a key rotation operation, a second key family after encrypting the first data encryption keys using the first key of the first key family, where a first key of the second key family is used to encrypt and decrypt second data encryption keys that are associated with one or more second data management jobs that occur after the one or more first data management jobs, and create, as part of a rekeying operation, a second key of the first key family and a second key of the second key family, where the second key of the first key family is used to decrypt the first data encryption keys, and the second key of the second key family is used to encrypt third data encryption keys and to decrypt the second data encryption keys and the third data encryption keys, the third data encryption keys associated with one or more third data management jobs that occur after the one or more second data management jobs.

Another apparatus is described. The apparatus may include means for creating a first key family, where a first key of the first key family is used to encrypt and decrypt first data encryption keys associated with one or more first data management jobs, means for creating, as part of a key rotation operation, a second key family after encrypting the first data encryption keys using the first key of the first key family, where a first key of the second key family is used to encrypt and decrypt second data encryption keys that are associated with one or more second data management jobs that occur after the one or more first data management jobs, and means for creating, as part of a rekeying operation, a second key of the first key family and a second key of the second key family, where the second key of the first key family is used to decrypt the first data encryption keys, and the second key of the second key family is used to encrypt third data encryption keys and to decrypt the second data encryption keys and the third data encryption keys, the third data encryption keys associated with one or more third data management jobs that occur after the one or more second data management jobs.

A non-transitory computer-readable medium storing code is described. The code may include instructions executable by a processor to create a first key family, where a first key of the first key family is used to encrypt and decrypt first data encryption keys associated with one or more first data management jobs, create, as part of a key rotation operation, a second key family after encrypting the first data encryption keys using the first key of the first key family, where a first key of the second key family is used to encrypt and decrypt second data encryption keys that are associated with one or more second data management jobs that occur after the one or more first data management jobs, and create, as part of a rekeying operation, a second key of the first key family and a second key of the second key family, where the second key of the first key family is used to decrypt the first data encryption keys, and the second key of the second key family is used to encrypt third data encryption keys and to decrypt the second data encryption keys and the third data encryption keys, the third data encryption keys associated with one or more third data management jobs that occur after the one or more second data management jobs.

Some examples of the method, apparatuses, and non-transitory computer-readable medium described herein may further include operations, features, means, or instructions for receiving, after the rekeying operation, a request for an active read/write key and sending, in response to the request, the second key of the second key family as the active read/write key, where the second key of the second key family may be in an encrypted format.

In some examples of the method, apparatuses, and non-transitory computer-readable medium described herein, the request may be received from an instance of a key manager that may be associated with a data protection job, the data protection job configured to encrypt data protection information generated by the data protection job with a data encryption key and to encrypt the data encryption key with the active read/write key.

Some examples of the method, apparatuses, and non-transitory computer-readable medium described herein may further include operations, features, means, or instructions for receiving, from the instance of the key manager and based on sending the second key of the second key family, a version of the data encryption key that may have been encrypted using the second key of the second key family and an indication that the data encryption key was encrypted with the second key of the second key family, and storing the version of the data encryption key and the indication that the data encryption key was encrypted with the second key of the second key family.

Some examples of the method, apparatuses, and non-transitory computer-readable medium described herein may further include operations, features, means, or instructions for indicating a lease duration for the active read/write key, where a lease of the active read/write key expires at an end of the lease duration, and receiving, at the end of the lease duration, a second request for the active read/write key.

Some examples of the method, apparatuses, and non-transitory computer-readable medium described herein may further include operations, features, means, or instructions for creating, as part of a second rekeying operation that occurs after the rekeying operation and before the end of the lease duration, a third key of the first key family and a third key of the second key family and sending, in response to the second request and based on the second rekeying operation, the third key of the second key family.

Some examples of the method, apparatuses, and non-transitory computer-readable medium described herein may further include operations, features, means, or instructions for receiving, after the rekeying operation, a request for a data encryption key used to encrypt data protection information generated for a data object by a data protection job included in the one or more first data management jobs, the request including an ID of the data object, and sending, in response to the request and based on the ID of the data object, the data encryption key and an indication of a key used to encrypt the data encryption key, where the data encryption key may be in an encrypted format.

Some examples of the method, apparatuses, and non-transitory computer-readable medium described herein may further include operations, features, means, or instructions for receiving, based on sending the data encryption key and the indication of the key used to encrypt the data encryption key, a second request for the key used to encrypt the data encryption key and sending, in response to the second request and based on the indication of the key used to encrypt the data encryption key, the second key of the first key family as the key used to encrypt the data encryption key, where the second key of the first key family may be in the encrypted format and may be a read-only key.

In some examples of the method, apparatuses, and non-transitory computer-readable medium described herein, the request may be received from an instance of a key manager that may be instantiated for a data restoration job.

Some examples of the method, apparatuses, and non-transitory computer-readable medium described herein may further include operations, features, means, or instructions for storing the first key family and the second key family at a storage location within a first computing system managed by a first operator and receiving, after the rekeying operation, a request for an active read/write key, where the request may be received from a key manager implemented at a second computing system managed by a second operator.

Some examples of the method, apparatuses, and non-transitory computer-readable medium described herein may further include operations, features, means, or instructions for creating, as part of a second key rotation operation that occurs after the rekeying operation, a third key family after the rekeying operation, where the second key of the first key family may be used to decrypt the first data encryption keys, the second key of the second key family may be used to decrypt the second data encryption keys and the third data encryption keys, and a first key of the third key family may be used to encrypt and decrypt fourth data encryption keys that may be associated with one or more fourth data management jobs that occur after the one or more third data management jobs.

Some examples of the method, apparatuses, and non-transitory computer-readable medium described herein may further include operations, features, means, or instructions for creating, as part of a second rekeying operation that occurs after the second key rotation operation, a third key of the first key family, a third key of the second key family, and a second key of the third key family, where the third key of the first key family may be used to decrypt the first data encryption keys, the third key of the second key family may be used to decrypt the second data encryption keys and the third data encryption keys, and the second key of the third key family may be used to encrypt fifth data encryption keys and to decrypt the fourth data encryption keys and the fifth data encryption keys, the fifth data encryption keys associated with one or more fifth data management jobs that occur after the one or more fourth data management jobs.

Some examples of the method, apparatuses, and non-transitory computer-readable medium described herein may further include operations, features, means, or instructions for creating, as part of a second rekeying operation that occurs after the rekeying operation, a third key of the first key family and a third key of the second key family, where the third key of the first key family may be used to decrypt the first data encryption keys and the third key of the second key family may be used to encrypt fourth data encryption keys and to decrypt the third data encryption keys and the fourth data encryption keys, the fourth data encryption keys associated with one or more fourth data management jobs that occur after the one or more third data management jobs.

Some examples of the method, apparatuses, and non-transitory computer-readable medium described herein may further include operations, features, means, or instructions for creating one or more higher-layer key families including higher-level key encryption keys used to encrypt and decrypt lower-level key encryption keys that may be used to encrypt data encryption keys, the lower-level key encryption keys including the first key family and the second key family, and the data encryption keys including the first data encryption keys, the second data encryption keys, and the third data encryption keys.

Some examples of the method, apparatuses, and non-transitory computer-readable medium described herein may further include operations, features, means, or instructions for receiving, from a customer and prior to creating the second key family, one or more keys for encrypting data encryption keys, where the first key of the second key family, the second key of the first key family, and the second key of the second key family may be selected from the one or more keys received from the customer.

In some examples of the method, apparatuses, and non-transitory computer-readable medium described herein, configuring, after the key rotation operation, the first key of the first key family to be in a read-only state and the first key of the second key family to be in an active read/write state, where the first key of the first key family may be configured for decrypting the first data encryption keys encrypted by the first key family based on being in the read-only state, and configuring, after the rekeying operation, the first key of the first key family to be in an inactive state, the second key of the first key family to be in the read-only state, the first key of the second key family to be in the inactive state, and the second key of the second key family to be in the active read/write state, where the second key of the first key family may be configured for decrypting the first data encryption keys encrypted by the first key family based on being in the read-only state.

In some examples of the method, apparatuses, and non-transitory computer-readable medium described herein, as part of the rekeying operation, the method, apparatuses, and non-transitory computer-readable medium may include further operations, features, means, or instructions for decrypting the first data encryption keys using the first key of the first key family to obtain plain-text versions of the first data encryption keys and encrypting the plain-text versions of the first data encryption keys using the second key of the first key family and decrypting the second data encryption keys using the first key of the second key family to obtain plain-text versions of the second data encryption keys and encrypting the plain-text versions of the second data encryption keys using the second key of the second key family.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
creating a first key family, wherein a first key of the first key family is used to encrypt and decrypt first data encryption keys associated with one or more first data management jobs;
creating, as part of a key rotation operation, a second key family after encrypting the first data encryption keys using the first key of the first key family, wherein a first key of the second key family is used to encrypt and decrypt second data encryption keys that are associated with one or more second data management jobs that occur after the one or more first data management jobs; and
creating, as part of a rekeying operation, a second key of the first key family and a second key of the second key family, wherein:
the second key of the first key family is used to decrypt the first data encryption keys, and
the second key of the second key family is used to encrypt third data encryption keys and to decrypt the second data encryption keys and the third data encryption keys, the third data encryption keys associated with one or more third data management jobs that occur after the one or more second data management jobs.

2. The method of claim 1, further comprising:
receiving, after the rekeying operation, a request for an active read/write key; and
sending, in response to the request, the second key of the second key family as the active read/write key, wherein the second key of the second key family is in an encrypted format.

3. The method of claim 2, wherein the request is received from an instance of a key manager that is associated with a data protection job, the data protection job configured to encrypt data protection information generated by the data protection job with a data encryption key and to encrypt the data encryption key with the active read/write key.

4. The method of claim 3, further comprising:
receiving, from the instance of the key manager and based at least in part on sending the second key of the second key family, a version of the data encryption key that has been encrypted using the second key of the second key family and an indication that the data encryption key was encrypted with the second key of the second key family; and
storing the version of the data encryption key and the indication that the data encryption key was encrypted with the second key of the second key family.

5. The method of claim 2, further comprising:
indicating a lease duration for the active read/write key, wherein a lease of the active read/write key expires at an end of the lease duration; and
receiving, at the end of the lease duration, a second request for the active read/write key.

6. The method of claim 5, further comprising:
creating, as part of a second rekeying operation that occurs after the rekeying operation and before the end of the lease duration, a third key of the first key family and a third key of the second key family; and
sending, in response to the second request and based at least in part on the second rekeying operation, the third key of the second key family.

7. The method of claim 1, further comprising:
receiving, after the rekeying operation, a request for a data encryption key used to encrypt data protection information generated for a data object by a data protection job included in the one or more first data management jobs, the request comprising an identifier of the data object; and
sending, in response to the request and based at least in part on the identifier of the data object, the data encryption key and an indication of a key used to encrypt the data encryption key, wherein the data encryption key is in an encrypted format.

8. The method of claim 7, further comprising:
receiving, based on sending the data encryption key and the indication of the key used to encrypt the data encryption key, a second request for the key used to encrypt the data encryption key; and
sending, in response to the second request and based at least in part on the indication of the key used to encrypt the data encryption key, the second key of the first key family as the key used to encrypt the data encryption key, wherein the second key of the first key family is in the encrypted format and is a read-only key.

9. The method of claim 7, wherein the request is received from an instance of a key manager that is instantiated for a data restoration job.

10. The method of claim 1, further comprising:
storing the first key family and the second key family at a storage location within a first computing system managed by a first operator; and
receiving, after the rekeying operation, a request for an active read/write key, wherein the request is received from a key manager implemented at a second computing system managed by a second operator.

11. The method of claim 1, further comprising:
creating, as part of a second key rotation operation that occurs after the rekeying operation, a third key family after the rekeying operation, wherein:
the second key of the first key family is used to decrypt the first data encryption keys,
the second key of the second key family is used to decrypt the second data encryption keys and the third data encryption keys, and
a first key of the third key family is used to encrypt and decrypt fourth data encryption keys that are associated with one or more fourth data management jobs that occur after the one or more third data management jobs.

12. The method of claim 11, further comprising:
creating, as part of a second rekeying operation that occurs after the second key rotation operation, a third key of the first key family, a third key of the second key family, and a second key of the third key family, wherein:
the third key of the first key family is used to decrypt the first data encryption keys,
the third key of the second key family is used to decrypt the second data encryption keys and the third data encryption keys, and
the second key of the third key family is used to encrypt fifth data encryption keys and to decrypt the fourth data encryption keys and the fifth data encryption keys, the fifth data encryption keys associated with one or more fifth data management jobs that occur after the one or more fourth data management jobs.

13. The method of claim 1, further comprising:
creating, as part of a second rekeying operation that occurs after the rekeying operation, a third key of the first key family and a third key of the second key family, wherein:
the third key of the first key family is used to decrypt the first data encryption keys, and
the third key of the second key family is used to encrypt fourth data encryption keys and to decrypt the third data encryption keys and the fourth data encryption keys, the fourth data encryption keys associated with one or more fourth data management jobs that occur after the one or more third data management jobs.

14. The method of claim 1, further comprising:
creating one or more higher-layer key families comprising higher-level key encryption keys used to encrypt and decrypt lower-level key encryption keys that are used to encrypt data encryption keys, the lower-level key encryption keys comprising the first key family and the second key family, and the data encryption keys comprising the first data encryption keys, the second data encryption keys, and the third data encryption keys.

15. The method of claim 1, further comprising:
receiving, from a customer and prior to creating the second key family, one or more keys for encrypting data encryption keys, wherein the first key of the second key family, the second key of the first key family, and the second key of the second key family are selected from the one or more keys received from the customer.

16. The method of claim 1, further comprising:
configuring, after the key rotation operation, the first key of the first key family to be in a read-only state and the first key of the second key family to be in an active read/write state, wherein the first key of the first key family is configured for decrypting the first data encryption keys encrypted by the first key family based at least in part on being in the read-only state; and
configuring, after the rekeying operation, the first key of the first key family to be in an inactive state, the second key of the first key family to be in the read-only state, the first key of the second key family to be in the inactive state, and the second key of the second key family to be in the active read/write state, wherein the second key of the first key family is configured for decrypting the first data encryption keys encrypted by the first key family based at least in part on being in the read-only state.

17. The method of claim 1, wherein, as part of the rekeying operation, the method further comprises:
decrypting the first data encryption keys using the first key of the first key family to obtain plain-text versions of the first data encryption keys and encrypting the plain-text versions of the first data encryption keys using the second key of the first key family; and
decrypting the second data encryption keys using the first key of the second key family to obtain plain-text versions of the second data encryption keys and encrypting the plain-text versions of the second data encryption keys using the second key of the second key family.

18. An apparatus, comprising:
a processor;
memory coupled with the processor; and
instructions stored in the memory and executable by the processor to cause the apparatus to:
create a first key family, wherein a first key of the first key family is used to encrypt and decrypt first data encryption keys associated with one or more first data management jobs;
create, as part of a key rotation operation, a second key family after encrypting the first data encryption keys using the first key of the first key family, wherein a first key of the second key family is used to encrypt and decrypt second data encryption keys that are associated with one or more second data management jobs that occur after the one or more first data management jobs; and
create, as part of a rekeying operation, a second key of the first key family and a second key of the second key family, wherein:
the second key of the first key family is used to decrypt the first data encryption keys, and
the second key of the second key family is used to encrypt third data encryption keys and to decrypt the second data encryption keys and the third data encryption keys, the third data encryption keys associated with one or more third data management jobs that occur after the one or more second data management jobs.

19. The apparatus of claim 18, wherein the instructions are further executable by the processor to cause the apparatus to:
receive, after the rekeying operation, a request for an active read/write key; and
send, in response to the request, the second key of the second key family as the active read/write key, wherein the second key of the second key family is in an encrypted format.

20. A non-transitory computer-readable medium storing code, the code comprising instructions executable by a processor to:
create a first key family, wherein a first key of the first key family is used to encrypt and decrypt first data encryption keys associated with one or more first data management jobs;
create, as part of a key rotation operation, a second key family after encrypting the first data encryption keys using the first key of the first key family, wherein a first key of the second key family is used to encrypt and decrypt second data encryption keys that are associated with one or more second data management jobs that occur after the one or more first data management jobs; and create, as part of a rekeying operation, a second key of the first key family and a second key of the second key family, wherein:
the second key of the first key family is used to decrypt the first data encryption keys, and
the second key of the second key family is used to encrypt third data encryption keys and to decrypt the second data encryption keys and the third data encryption keys, the third data encryption keys associated with one or more third data management jobs that occur after the one or more second data management jobs.

* * * * *